US012731275B2

(12) United States Patent
Yamamoto

(10) Patent No.: US 12,731,275 B2
(45) Date of Patent: Sep. 8, 2026

(54) IMAGE PROCESSING DEVICE, COMPONENT GRIPPING SYSTEM, IMAGE PROCESSING METHOD AND COMPONENT GRIPPING METHOD

(71) Applicant: YAMAHA HATSUDOKI KABUSHIKI KAISHA, Iwata (JP)

(72) Inventor: Atsushi Yamamoto, Iwata (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 246 days.

(21) Appl. No.: 18/685,425

(22) PCT Filed: Sep. 15, 2021

(86) PCT No.: PCT/JP2021/033963
§ 371 (c)(1),
(2) Date: Feb. 21, 2024

(87) PCT Pub. No.: WO2023/042307
PCT Pub. Date: Mar. 23, 2023

(65) Prior Publication Data
US 2024/0346798 A1 Oct. 17, 2024

(51) Int. Cl.
*G06V 10/25* (2022.01)
*B25J 19/02* (2006.01)
*G06T 7/55* (2017.01)
*G06T 7/73* (2017.01)
(Continued)

(52) U.S. Cl.
CPC ............ *G06V 10/25* (2022.01); *B25J 19/023* (2013.01); *G06T 7/55* (2017.01); *G06T 7/74* (2017.01); *G06T 11/60* (2013.01); *G06V 10/82* (2022.01); *G06T 2207/10028* (2013.01); *G06T 2207/20076* (2013.01); *G06T 2207/20081* (2013.01);
(Continued)

(58) Field of Classification Search
None
See application file for complete search history.

(56) References Cited

U.S. PATENT DOCUMENTS

2015/0127162 A1* 5/2015 Gotou .................... B25J 9/1612 700/259
2018/0037412 A1* 2/2018 Lynch .................... B65G 1/137
2019/0099891 A1* 4/2019 Tomioka ................ B25J 9/1697
(Continued)

FOREIGN PATENT DOCUMENTS

JP 2015-089589 A 5/2015
JP 2015-114292 A 6/2015
(Continued)

OTHER PUBLICATIONS

International Search Report issued in PCT/JP2021/033963; mailed Dec. 7, 2021.

*Primary Examiner* — Leon Viet Q Nguyen
(74) *Attorney, Agent, or Firm* — Studebaker Brackett PLLC

(57) ABSTRACT

A composite image is generated by combining a gray scale image, referred to as a luminance image, and a depth image respectively representing the plurality of components. In the generated composite image, the shape of the component at a relatively high position among the plurality of components easily remains, and the composite image is useful in confirming such a component.

19 Claims, 24 Drawing Sheets

(51) Int. Cl.
*G06T 11/60* (2006.01)
*G06V 10/82* (2022.01)

(52) U.S. Cl.
CPC ............... *G06T 2207/20084* (2013.01); *G06T 2207/30164* (2013.01); *G06V 2201/06* (2022.01)

(56) References Cited

U.S. PATENT DOCUMENTS

| | | | | |
|---|---|---|---|---|
| 2019/0152054 | A1* | 5/2019 | Ishikawa | B25J 15/08 |
| 2019/0361672 | A1* | 11/2019 | Odhner | B25J 9/1679 |
| 2021/0053214 | A1* | 2/2021 | Shibata | B25J 9/1635 |

FOREIGN PATENT DOCUMENTS

| | | | |
|---|---|---|---|
| JP | 2015-147256 | A | 8/2015 |
| JP | 2017-062790 | A | 3/2017 |
| JP | 2019-155561 | A | 9/2019 |
| JP | 2019-531907 | A | 11/2019 |
| JP | 2020-015141 | A | 1/2020 |

* cited by examiner

F I G. 1
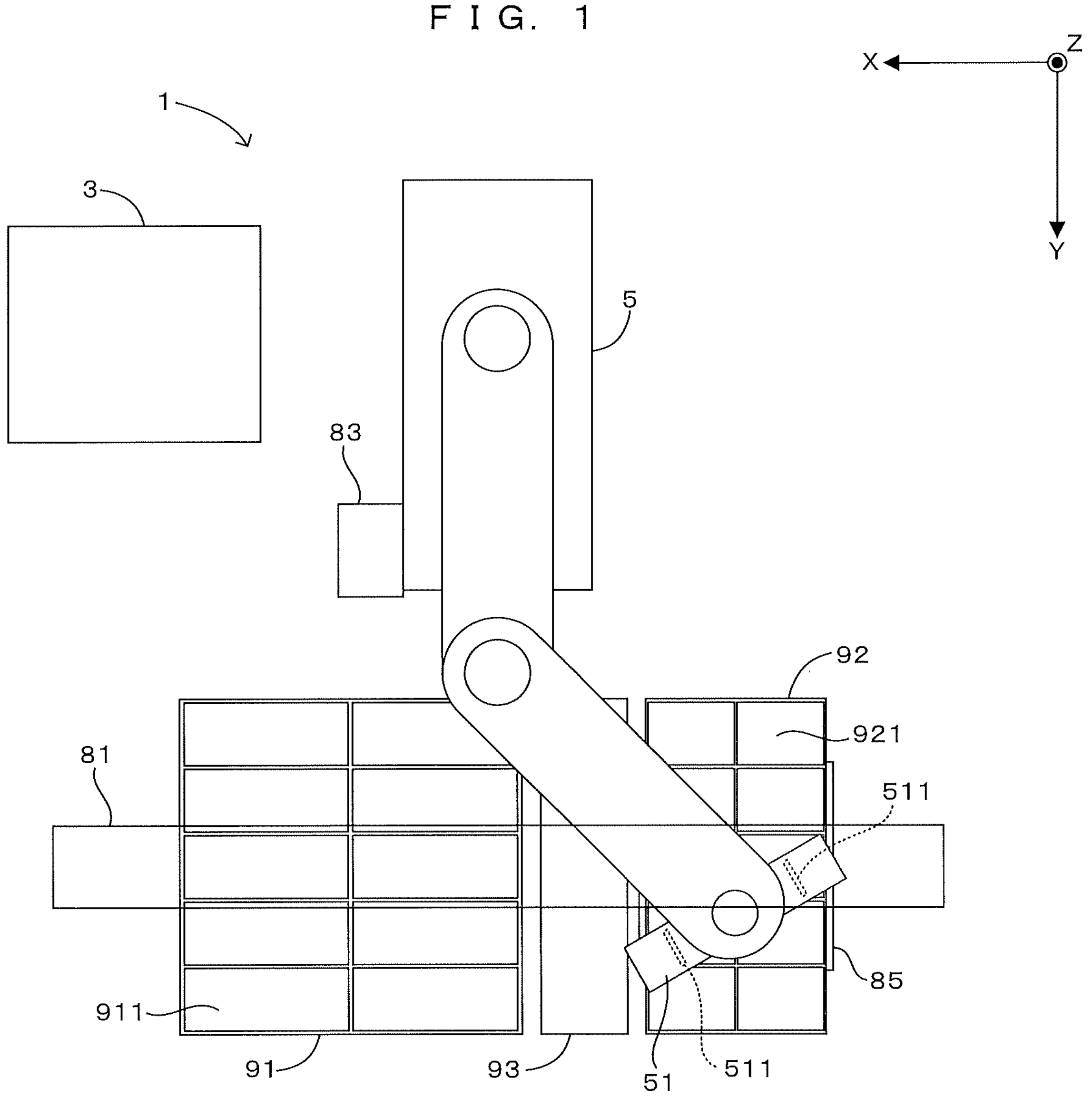

F I G. 2
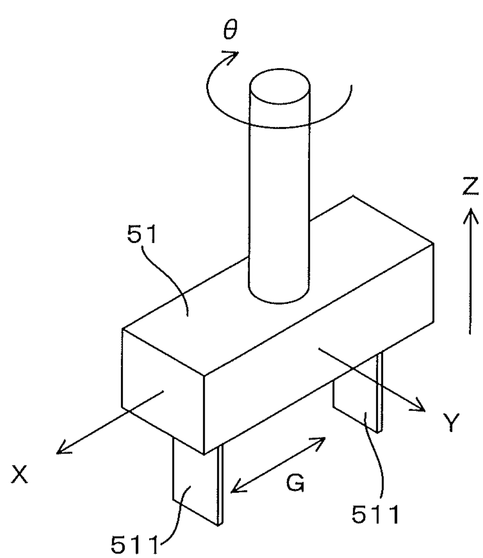

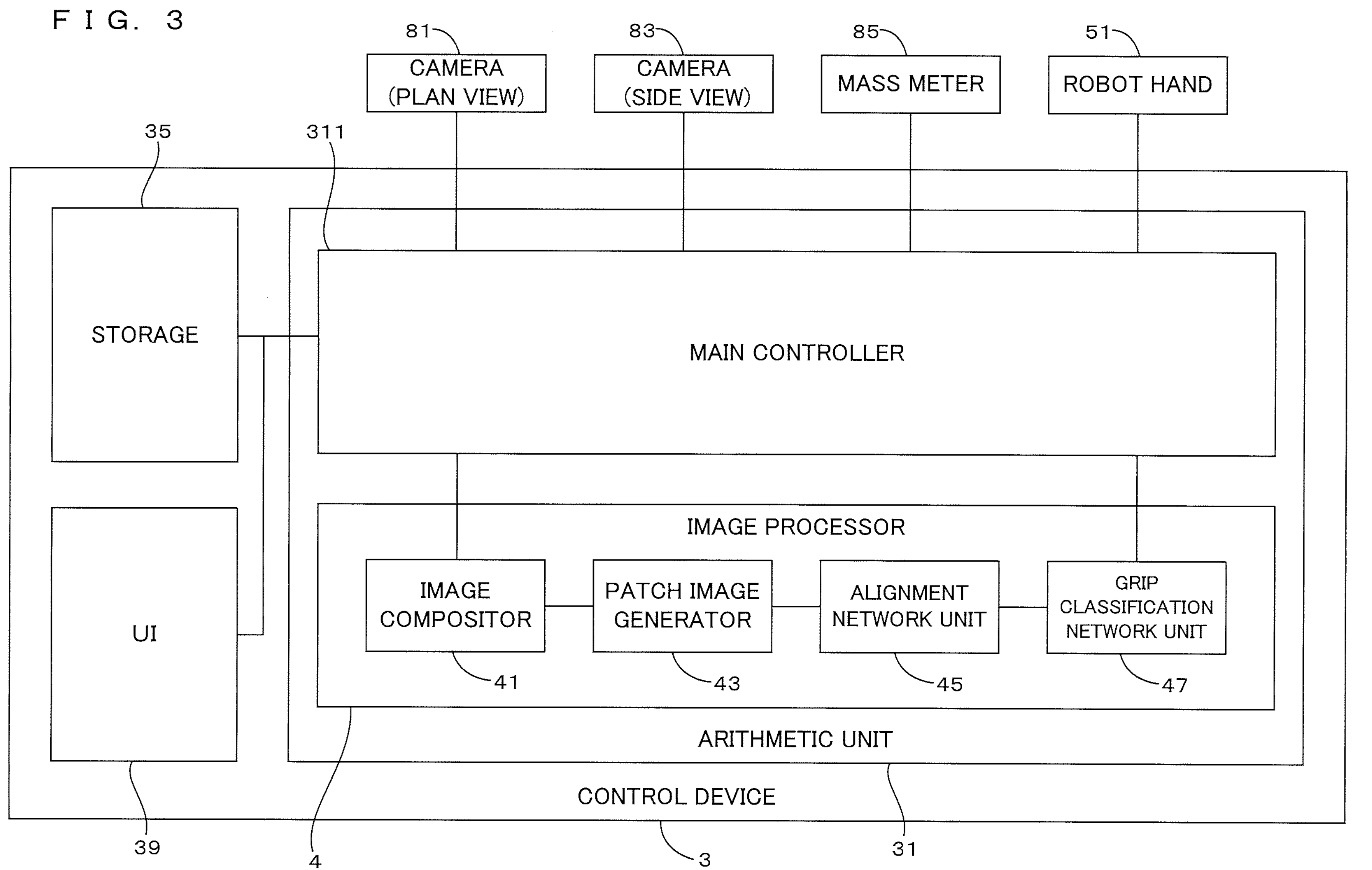
F I G. 3
81
CAMERA (PLAN VIEW)
83
CAMERA (SIDE VIEW)
85
MASS METER
51
ROBOT HAND
35
311
STORAGE
MAIN CONTROLLER
UI
IMAGE PROCESSOR
IMAGE COMPOSITOR
PATCH IMAGE GENERATOR
ALIGNMENT NETWORK UNIT
GRIP CLASSIFICATION NETWORK UNIT
41
43
45
47
ARITHMETIC UNIT
CONTROL DEVICE
39
4
3
31

FIG. 4A

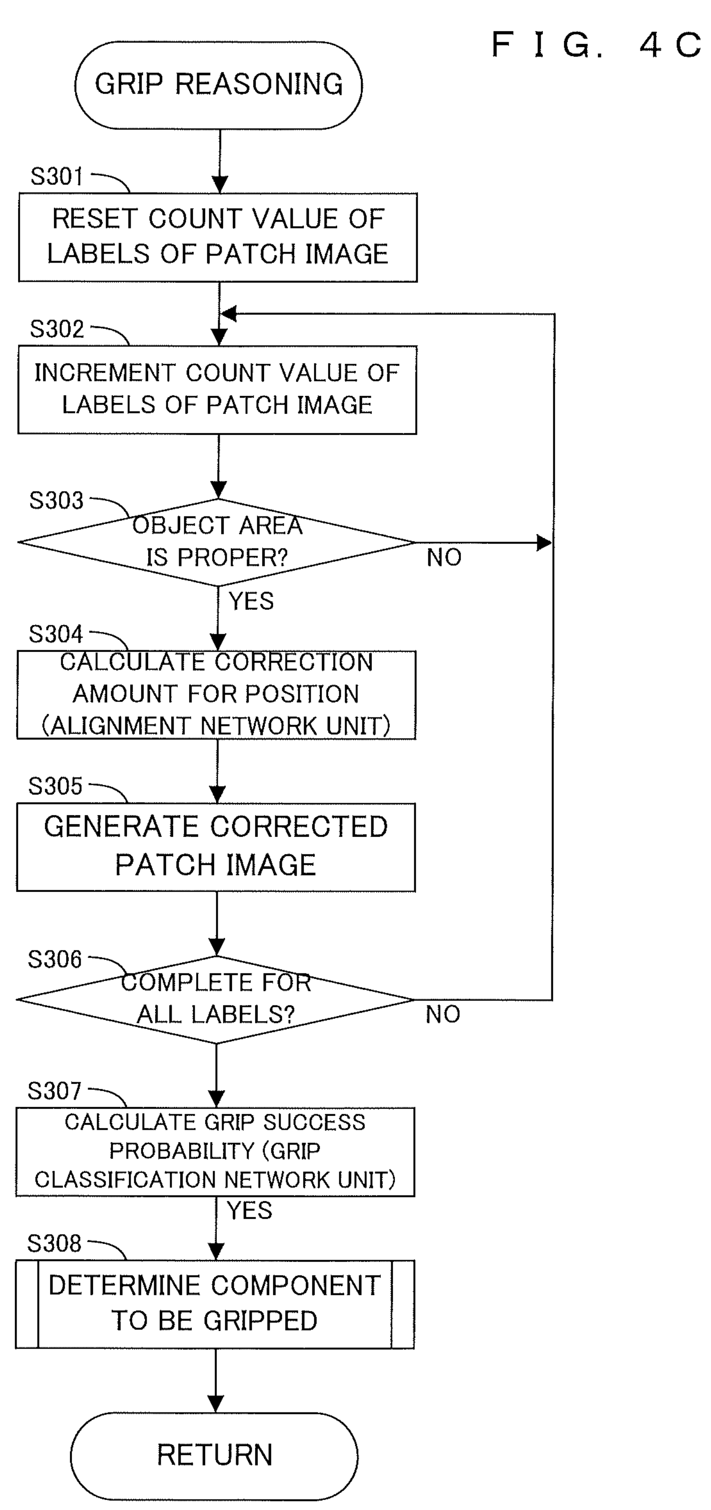
FIG. 4C
GRIP REASONING
S301
RESET COUNT VALUE OF LABELS OF PATCH IMAGE
S302
INCREMENT COUNT VALUE OF LABELS OF PATCH IMAGE
S303
OBJECT AREA IS PROPER?
NO
YES
S304
CALCULATE CORRECTION AMOUNT FOR POSITION (ALIGNMENT NETWORK UNIT)
S305
GENERATE CORRECTED PATCH IMAGE
S306
COMPLETE FOR ALL LABELS?
NO
S307
CALCULATE GRIP SUCCESS PROBABILITY (GRIP CLASSIFICATION NETWORK UNIT)
YES
S308
DETERMINE COMPONENT TO BE GRIPPED
RETURN

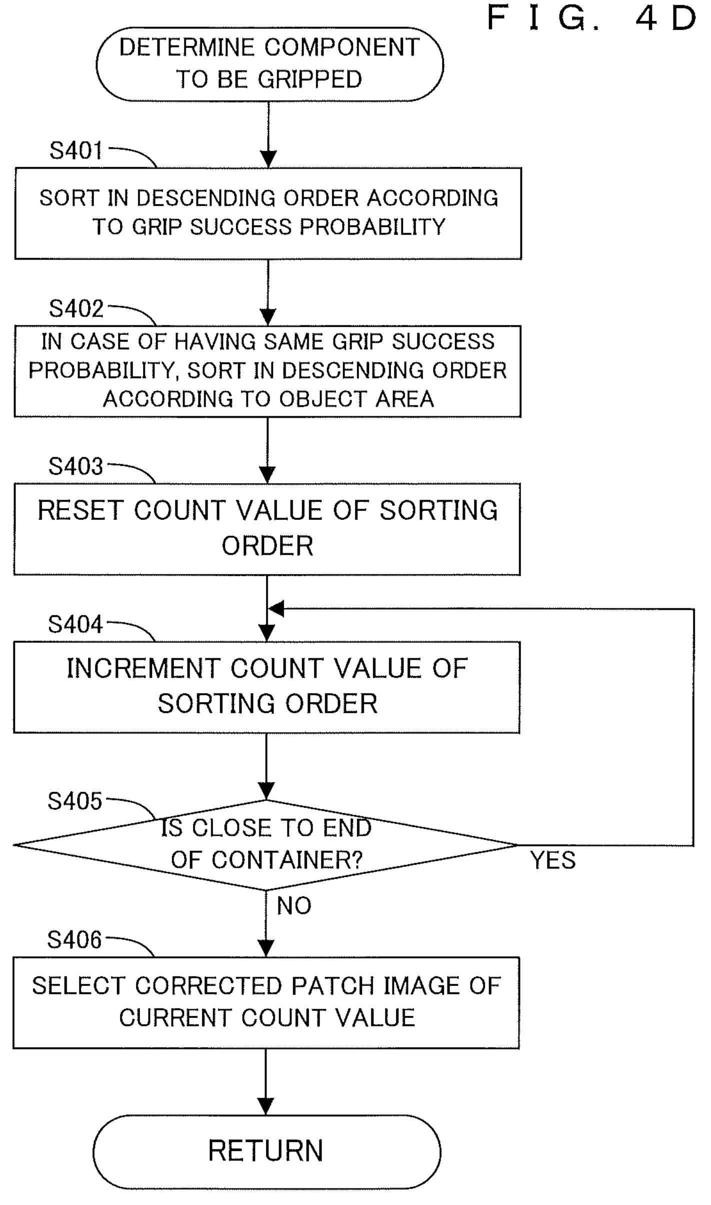
F I G. 4 D
DETERMINE COMPONENT TO BE GRIPPED
S401
SORT IN DESCENDING ORDER ACCORDING TO GRIP SUCCESS PROBABILITY
S402
IN CASE OF HAVING SAME GRIP SUCCESS PROBABILITY, SORT IN DESCENDING ORDER ACCORDING TO OBJECT AREA
S403
RESET COUNT VALUE OF SORTING ORDER
S404
INCREMENT COUNT VALUE OF SORTING ORDER
S405
IS CLOSE TO END OF CONTAINER?
YES
NO
S406
SELECT CORRECTED PATCH IMAGE OF CURRENT COUNT VALUE
RETURN F I G. 5A
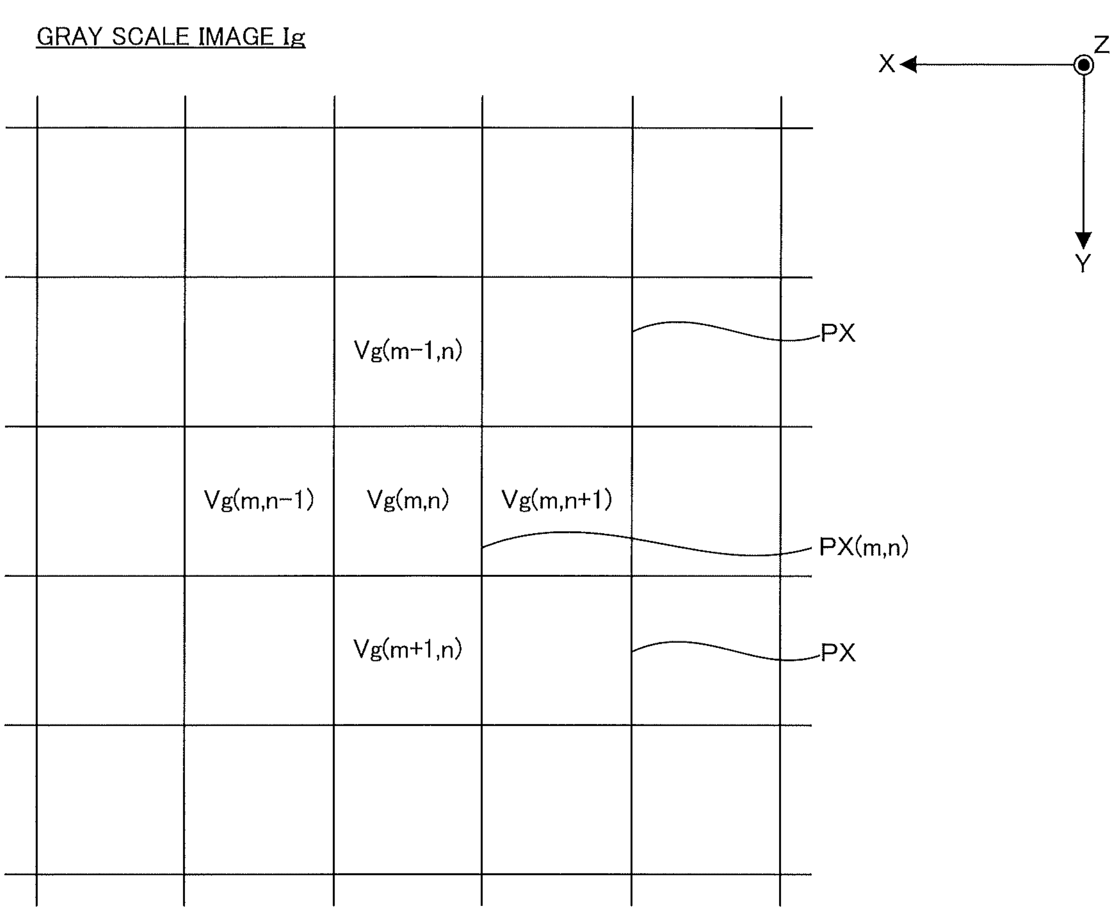

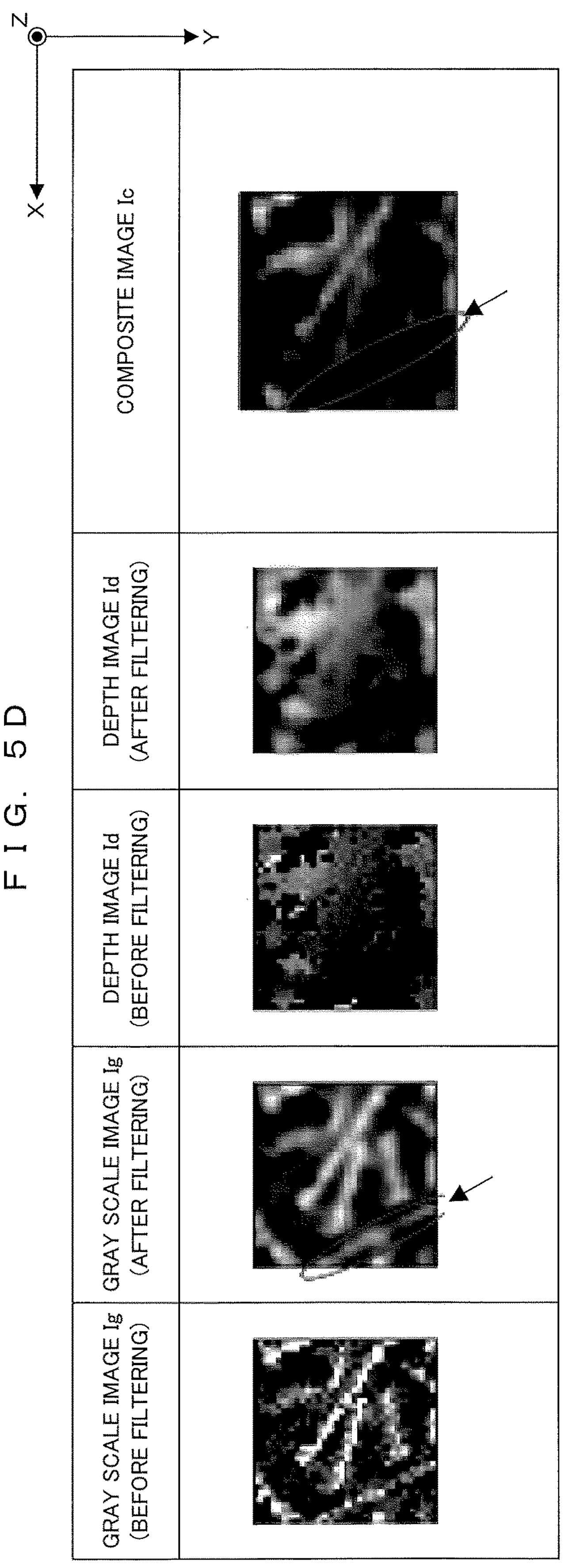
F I G. 5 D

FIG. 6A

PATCH IMAGE INFORMATION

| LABEL | POSITION OF CUTTING RANGE Rc | PATCH IMAGE Ip |
|---|---|---|
| 1 | $(x, y, \theta)$ | |
| 2 | ... | ... |
| 3 | ... | ... |
| ... | ... | ... |
| | | |

FIG. 6B

CORRECTED PATCH IMAGE INFORMATION

| LABEL | POSITION OF CORRECTED CUTTING RANGE Rcc | CORRECTED PATCH IMAGE Ipc |
|---|---|---|
| 1 | $(x+\Delta x, y+\Delta y, \theta+\Delta\theta)$ | |
| 2 | ... | ... |
| 3 | ... | ... |
| ... | ... | ... |
| | | |

F I G. 7

GRIP SUCCESS PROBABILITY INFORMATION

| LABEL | POSITION OF CORRECTED CLIPPING RANGE Rcc | CORRECTED PATCH IMAGE Ipc | GRIP SUCCESS PROBABILITY |
|---|---|---|---|
| 1 | $(x+\Delta x, y+\Delta y, \theta+\Delta\theta)$ | | 0.68 |
| 2 | ... | ... | ... |
| 3 | ... | ... | ... |
| ... | ... | ... | ... |
| | | | |

FIG. 8A

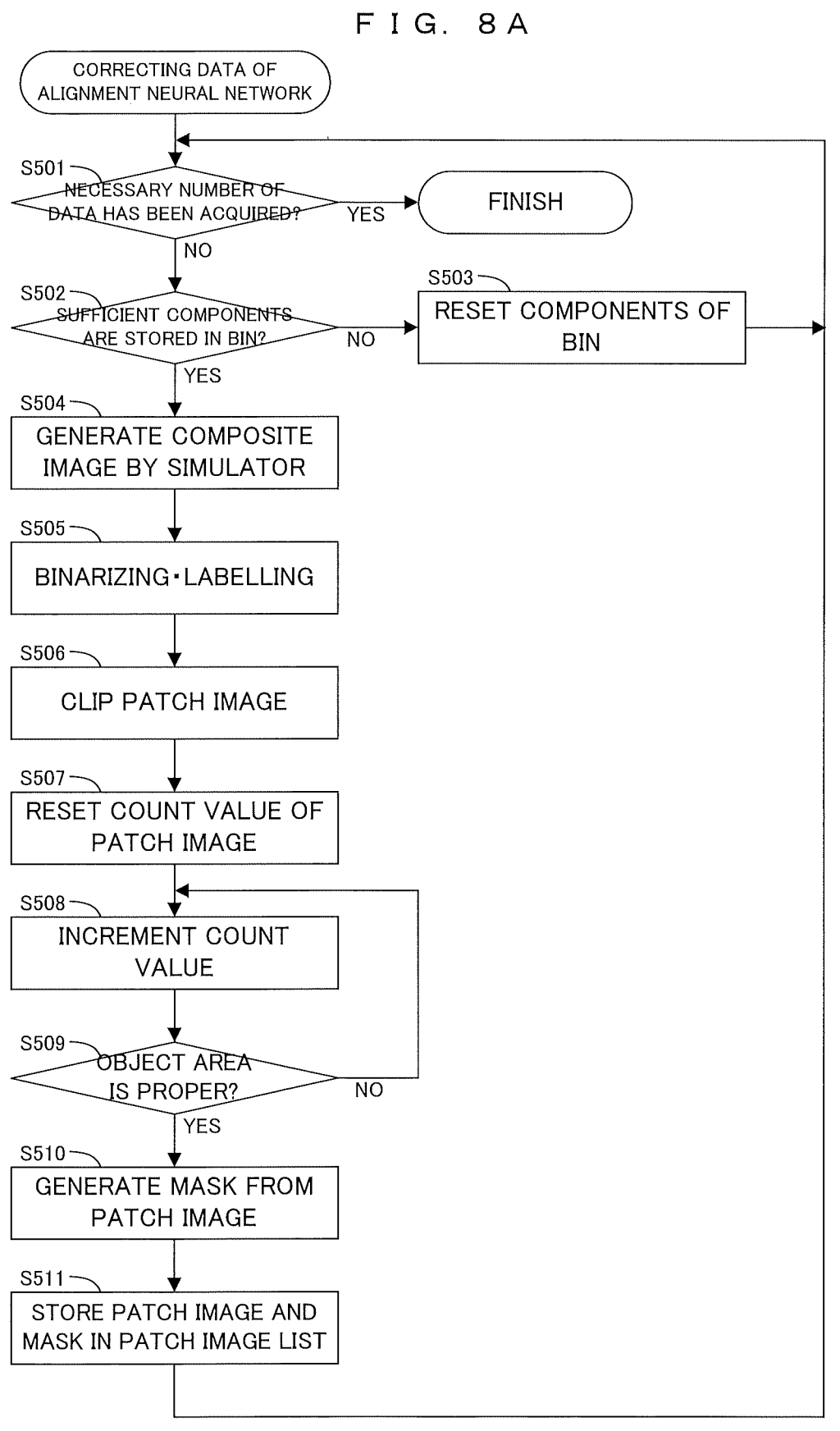

CORRECTING DATA OF ALIGNMENT NEURAL NETWORK

S501 NECESSARY NUMBER OF DATA HAS BEEN ACQUIRED?

YES

FINISH

NO

S502 SUFFICIENT COMPONENTS ARE STORED IN BIN?

NO

S503 RESET COMPONENTS OF BIN

YES

S504 GENERATE COMPOSITE IMAGE BY SIMULATOR

S505 BINARIZING·LABELLING

S506 CLIP PATCH IMAGE

S507 RESET COUNT VALUE OF PATCH IMAGE

S508 INCREMENT COUNT VALUE

S509 OBJECT AREA IS PROPER?

NO

YES

S510 GENERATE MASK FROM PATCH IMAGE

S511 STORE PATCH IMAGE AND MASK IN PATCH IMAGE LIST

F I G. 8 B
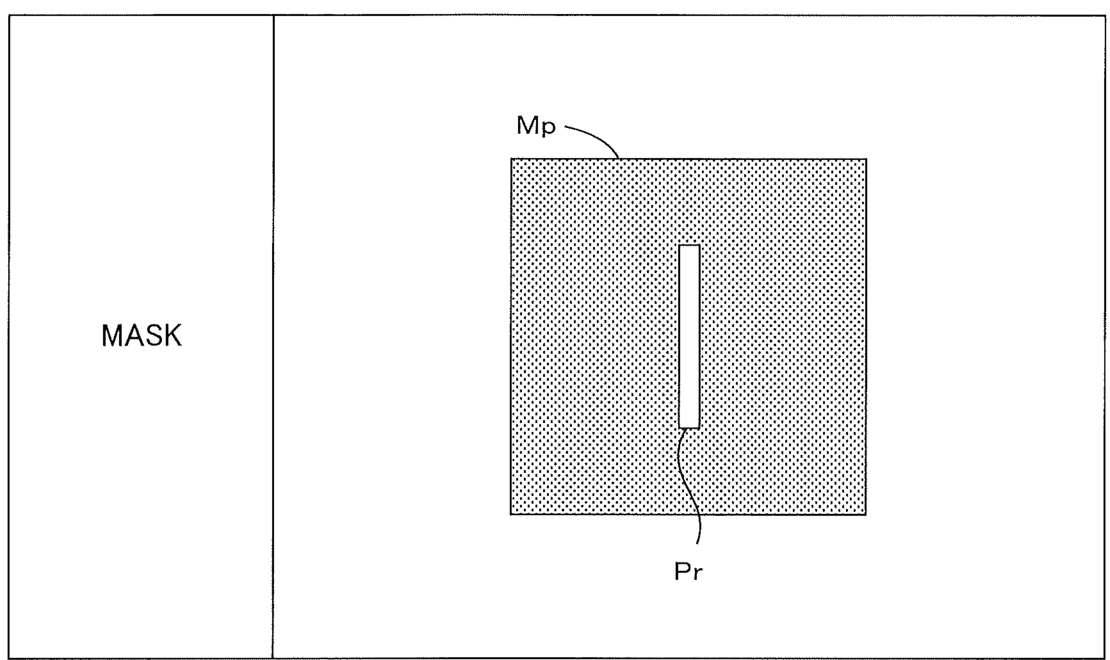

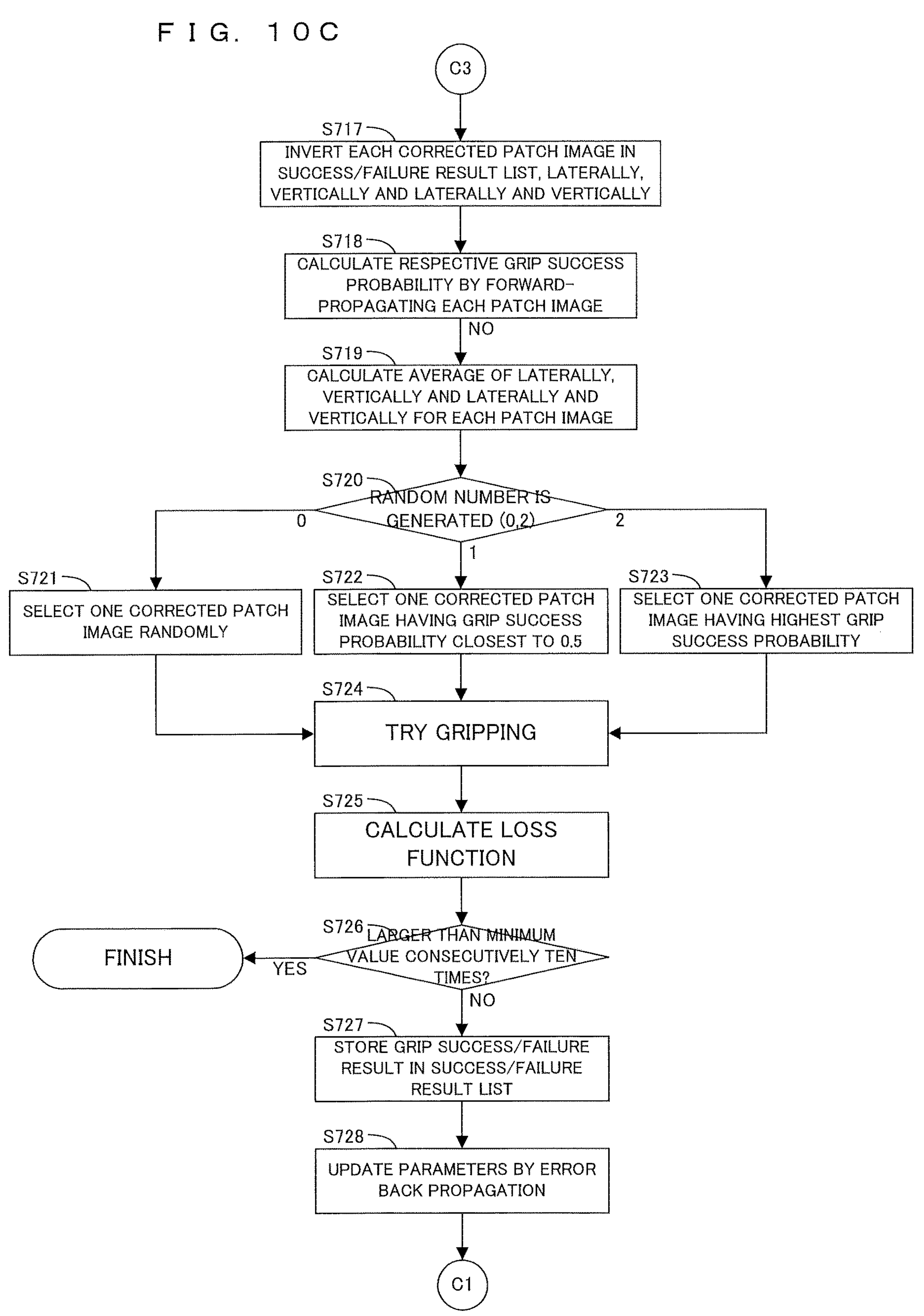
F I G. 1 0 C
C3
S717
INVERT EACH CORRECTED PATCH IMAGE IN SUCCESS/FAILURE RESULT LIST, LATERALLY, VERTICALLY AND LATERALLY AND VERTICALLY
S718
CALCULATE RESPECTIVE GRIP SUCCESS PROBABILITY BY FORWARD-PROPAGATING EACH PATCH IMAGE
NO
S719
CALCULATE AVERAGE OF LATERALLY, VERTICALLY AND LATERALLY AND VERTICALLY FOR EACH PATCH IMAGE
S720
RANDOM NUMBER IS GENERATED (0,2)
0
1
2
S721
SELECT ONE CORRECTED PATCH IMAGE RANDOMLY
S722
SELECT ONE CORRECTED PATCH IMAGE HAVING GRIP SUCCESS PROBABILITY CLOSEST TO 0.5
S723
SELECT ONE CORRECTED PATCH IMAGE HAVING HIGHEST GRIP SUCCESS PROBABILITY
S724
TRY GRIPPING
S725
CALCULATE LOSS FUNCTION
S726
LARGER THAN MINIMUM VALUE CONSECUTIVELY TEN TIMES?
YES
FINISH
NO
S727
STORE GRIP SUCCESS/FAILURE RESULT IN SUCCESS/FAILURE RESULT LIST
S728
UPDATE PARAMETERS BY ERROR BACK PROPAGATION
C1

IMAGE PROCESSING DEVICE, COMPONENT GRIPPING SYSTEM, IMAGE PROCESSING METHOD AND COMPONENT GRIPPING METHOD

CROSS-REFERENCE TO RELATED APPLICATION

This application is a National Stage of International Patent Application No. PCT/JP2021/033963, filed Sep. 15, 2021, the entire contents of which is incorporated herein by reference.

BACKGROUND

Technical Field

This disclosure relates to a technique for gripping a plurality of components stored in a container by a robot hand and is particularly suitably applicable to bin picking.

Background Art

In JP 2015-147256A, in gripping messily piled-up components by a robot hand, a captured image of the components is used to recognize the component to be gripped. Specifically, a region having a luminance equal to or higher than a predetermined threshold from the captured image of the piled-up components, is specified and point cloud data is generated for this region.

SUMMARY

To reliably grip a component in bin picking, it is preferred to grip a component in front of the robot hand, i.e. at a high position, out of a plurality of piled-up components. However, with the method of JP 2015-147256A, the point cloud data is generated for the limited region having the luminance equal to or higher than the threshold, in the captured image. Thus, if the luminance of the captured image does not precisely reflect heights of the components, the generated point cloud data cannot necessarily be said to be useful in recognizing the component at the high position.

This disclosure was developed in view of the above problem and aims to provide a technique useful in recognizing a component at a relatively high position, out of a plurality of components stored in a container.

An image processing device according to the disclosure, comprises an image acquirer configured to acquire a luminance image representing a plurality of components stored in a container and a depth image representing the plurality of components; and an image compositor configured to generate a composite image by combining the luminance image and the depth image acquired by the image acquirer.

An image processing method according to the disclosure, comprises acquiring a luminance image representing a plurality of components stored in a container and a depth image representing the plurality of components; and generating a composite image by combining the luminance image and the depth image.

In the image processing device and method thus configured, the composite image is generated by combining the luminance image and the depth image respectively representing the plurality of components. In the composite image generated in this way, the shape of the component at a relatively high position, out of the plurality of components, easily remains and the composite image is useful in recognizing such a component.

The image processing device may be configured so that the luminance image represents a luminance Vg for each pixel, the depth image represents a depth Vd for each pixel, the composite image represents a composite value Vc for each pixel, and the image compositor generates the composite image by calculating a composite value Vc obtained by weighting the luminance Vg by the depth Vd. In the composite image generated in this way, the shape of the component at a relatively high position, out of the plurality of components, easily remains and the composite image is useful in recognizing such a component.

The image processing device may be configured so that the image compositor generates the composite image based on the following equation:

$$Vc = Vd \times (1 + Vg/\max(Vg))$$

where max(Vg) is a maximum value of the luminances Vg included in the luminance image. In the composite image generated in this way, the shape of the component at a relatively high position, out of the plurality of components, easily remains and the composite image is useful in recognizing such a component.

The image processing device may further comprises a success probability calculator configured to generate a plurality of target component images representing different components that are different from each other by setting a hand range representing a range of a robot hand for the component and generating the target component image representing the component included in the hand range based on the composite image, and calculating a grip success probability when the robot hand tries to grip the component in a positional relationship of the robot hand and the component represented by the target component image for each of the plurality of target component images. In such a configuration, the hand range representing the range of the robot hand is set for the component included in the composite image, and the target component image representing the component included in the hand range is generated based on the composite image, and the grip success probability is calculated for each target component image. In the composite image used at this time, the shape of the component at a relatively high position easily remains as described above. Therefore, the target component image including the component at a relatively high position, in other words, the component having a relatively high grip success probability, can be reliably generated.

The image processing device may be configured so that the success probability calculator selects one target component image, out of the plurality of target component images, based on the grip success probabilities respectively calculated for the plurality of target component images and determines to grip the component represented by the one target component image by the robot hand in a posture represented by the one target component image. In such a configuration, a frequency of failure to grip the component by the robot hand can be suppressed.

The image processing device may be configured so that the success probability calculator selects the target component image having a highest grip success probability, out of the target component images not satisfying a predetermined exclusion condition out of the plurality of target component images, as the one target component image. In such a configuration, the frequency of failure to grip the component by the robot hand can be reliably suppressed.

For example, the predetermined exclusion condition is such a condition that a distance between an end of the container and the target component image is less than a predetermined value. In this way, the occurrence of a situation where the grip of the component fails due to a wall surface at the end of the container can be suppressed.

The image processing device may be configured so that the success probability calculator includes a neural network having learned a relationship of the target component image and the grip success probability using a success/failure of grip when the robot hand tries to grip the component in a positional relationship of the robot hand and the component represented by the target component image as training data, and the grip success probability is calculated for each of the plurality of target component images by the neural network. In such a configuration, the frequency of failure to grip the component by the robot hand can be reliably suppressed, utilizing a learning result of the neural network.

The disclosure can be said to be suitable for learning by such a neural network. That is, it is thought as an example of a learning method of the neural network to input both the luminance image and the depth image to the neural network and cause the neural network to learn a relationship of these images and the grip success probability. However, it is difficult for the neural network to learn the grip success probability of the robot hand based on the association of the luminance of the component represented by the luminance image and the height of the component represented by the depth image, and a computation load is also large. On the other hand, since the composite image obtained by combining the luminance image and the depth image is input to the neural network in the disclosure, the neural network can learn based on this composite image. As a result, learning can be relatively easily performed and the computation load can also be reduced.

The image processing device may further comprises a success/failure determiner configured to acquire grip state information representing a state in which the component represented by the one target component image is gripped by the robot hand in the posture represented by the one target component image and determining a success/failure of the grip of the component by the robot hand. In such a configuration, it can be confirmed whether or not the grip of the component selected based on the grip success probabilities obtained for the target component images has succeeded.

Note that various specific contents of the grip state information can be assumed. For example, the success/failure determiner may acquire a mass measured by a mass meter when the robot hand places the component gripped from the container on the mass meter as the grip state information. The success/failure determiner may acquire an image obtained by capturing the component gripped by the robot hand by a camera as the grip state information. In the latter case, the success/failure determiner may acquire a plurality of images obtained by capturing the component gripped by the robot hand from mutually different directions by the camera as the grip state information.

The image processing device may be configured so that the success probability calculator causes the neural network to relearn based on a result of acquiring the grip state information for the component gripped by the robot hand. In such a configuration, the relearning of the neural network is performed according to a success/failure result of the grip of the component selected based on the grip success probabilities obtained for the target component images, and the calculation accuracy of the grip success probability by the neural network can be improved.

A component gripping system according to the disclosure, comprises the image processing device; and a robot hand gripping the component based on a determination of the image processing device to select one target component image out of the plurality of target component images and grip the component represented by the one target component image by the robot hand in a posture represented by the one target component image.

A component gripping method according to the disclosure, comprises acquiring a luminance image representing a plurality of components stored in a container and a depth image representing the plurality of components: generating a composite image by combining the luminance image and the depth image; and generating a plurality of target component images respectively representing different components each other by setting a hand range representing a range of a robot hand for the component and generating the target component image representing the component included in the hand range based on the composite image and calculating a grip success probability when the robot hand tries to grip the component in a positional relationship of the robot hand and the component represented by the target component image for each of the plurality of target component images. The component gripping method further comprises selecting one target component image, out of the plurality of target component images, based on the grip success probabilities respectively calculated for the plurality of target component images and determining to grip the component represented by the one target component image by the robot hand in a posture represented by the one target component image; and gripping the component by the robot hand based on a determination to select one target component image out of the plurality of target component images and grip the component represented by the one target component image by the robot hand in a posture represented by the one target component image.

In the component gripping system and method thus configured, the composite image is generated by combining the luminance image and the depth image respectively representing the plurality of components. In the composite image generated in this way, the shape of the component at a relatively high position, out of the plurality of components, easily remains and the composite image is useful in recognizing such a component. Further, the robot hand grips the component based on a result of recognizing the component in this way. Therefore, the component can be gripped by the robot hand with a high success probability.

According to the disclosure, an image (composite image) useful in recognizing a component at a relatively high position, out of a plurality of components stored in a container, can be obtained.

BRIEF DESCRIPTION OF THE DRAWINGS

FIG. 1 is a plan view schematically showing an example of a component gripping system according to the disclosure;

FIG. 2 is a perspective view schematically showing a robot hand used to grip a component in the component gripping system of FIG. 1;

FIG. 3 is a block diagram showing an example of the electrical configuration of the control device;

Figure 4A:
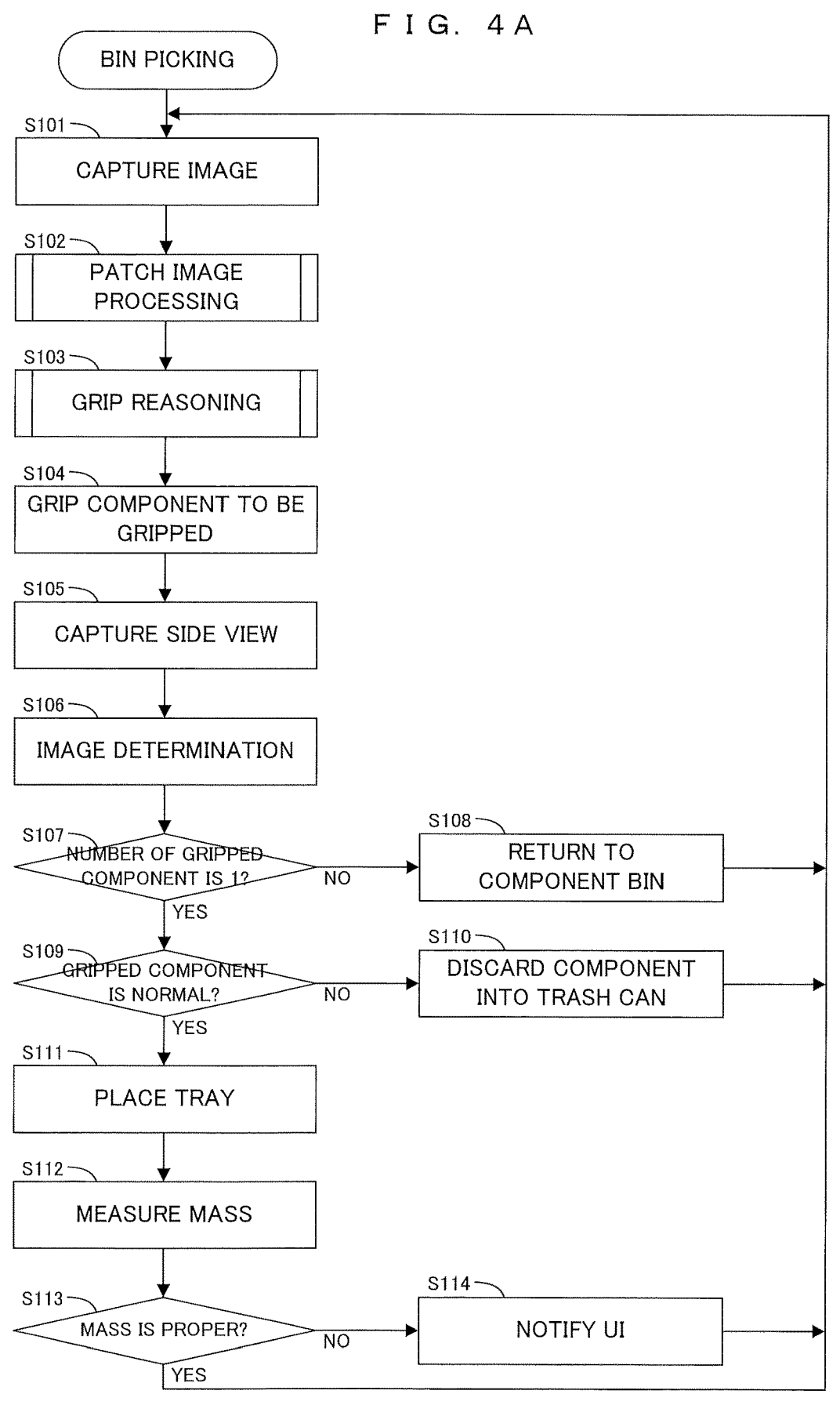

FIG. 4A is a flow chart showing an example of bin picking performed in the component gripping system of FIG. 1;

FIG. 4C is a flow chart showing an example of grip reasoning performed in bin picking of FIG. 4A;

FIG. 4D is a flow chart showing an example of determination of the component to be gripped performed in the grip reasoning of FIG. 4C;

FIG. 5A is diagram schematically showing operations performed in the patch image processing of FIG. 4B;

FIG. 5D is diagram schematically showing operations performed in the patch image processing of FIG. 4B;

FIG. 6A is diagram schematically showing operations performed in the grip reasoning of FIG. 4C;

FIG. 6B is diagram schematically showing operations performed in the grip reasoning of FIG. 4C;

FIG. 7 is diagram schematically showing operations performed in the grip reasoning of FIG. 4C;

FIG. 8A is a flow chart showing an example of a method for collecting learning data of the alignment neural network;

FIG. 8B is a diagram schematically showing an example of the position determination mask generated from the patch image;

FIG. 10C is an example of a flow chart for causing the grip classification neural network to learn;

DETAILED DESCRIPTION

Figure 4B:
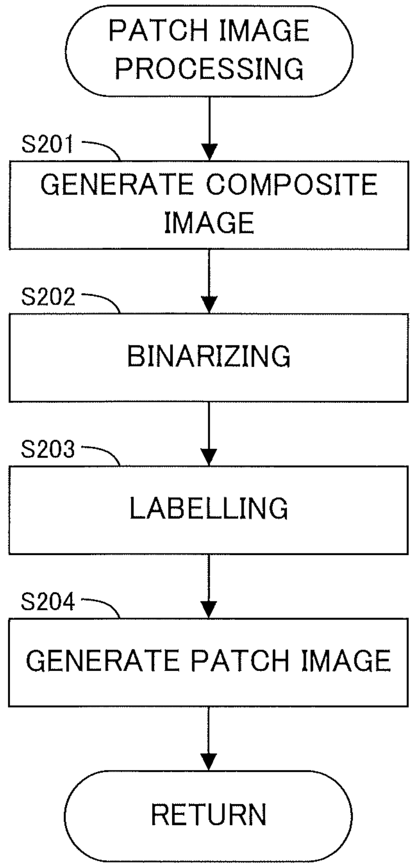
FIG. 4B is a flow chart showing an example of a patch image processing performed in bin picking of FIG. 4A.

FIG. 1 is a plan view schematically showing an example of a component gripping system according to the disclosure, and FIG. 2 is a perspective view schematically showing a robot hand used to grip a component in the component gripping system of FIG. 1. In these and following figures, an X-direction, which is a horizontal direction, a Y-direction, which is a horizontal direction orthogonal to the X-direction, and a Z-direction, which is a vertical direction, are shown as appropriate. These X-, Y- and Z-directions constitute a global coordinate system. As shown in FIG. 1, the component gripping system 1 comprises a control device 3 and a working robot 5, and the working robot 5 performs an operation (bin picking) based on a control by the control device 3.

Specifically, a component bin 91 and a kitting tray 92 are arranged in a work space of the working robot 5. The component bin 91 includes a plurality of compartmentalized storages 911 for storing components, and a multitude of components are piled up in each compartmentalized storage 911. The kitting tray 92 includes a plurality of compartmentalized storages 921 for storing the components, and a predetermined number of components are placed in each compartmentalized storage 921. The working robot 5 grips the component from the compartmentalized storage 911 of the component bin 91 (bin picking) and transfers the component to the compartmentalized storage 921 of the kitting tray 92. Further, a trash can 93 is arranged between the component bin 91 and the kitting tray 92 and, if a defective component is detected, the working robot 5 discards this defective component into the trash can 93.

The working robot 5 is a Scara robot having a robot hand 51 arranged on a tip, and transfers the component from the component bin 91 to the kitting tray 92 and discards the component into the trash can 93 by gripping the component by the robot hand 51 and moving the robot hand 51. This robot hand 51 has a degree of freedom in the X-direction, Y-direction and Z-direction and a θ-direction as shown in FIG. 2. Here, the θ-direction is a rotation direction centered on an axis of rotation parallel to the Z-direction. Further, the robot hand 51 includes two claws 511 arrayed in a gripping direction G, and each claw 511 has a flat plate shape orthogonal to the gripping direction G. The robot hand 51 can increase and decrease an interval between the two claws 511 in the gripping direction G, and grips the component by sandwiching the component in the gripping direction G by these claws 511. Note that although the gripping direction G is parallel to the X-direction in FIG. 2, the gripping direction G is possibly inclined with respect to the X-direction as a matter of course depending on the position of the robot hand 51 in the θ-direction.

Further, the component gripping system 1 comprises two cameras 81, 83 and a mass meter 85. The camera 81 is a plan view camera which images a multitude of components piled up in the compartmentalized storage 911 of the component bin 91 from the Z-direction (above), and faces the work space of the working robot 5 from the Z-direction. This camera 81 captures a gray scale image (two-dimensional image) representing an imaging target (components) by a luminance and a depth image (three-dimensional image) representing a distance to the imaging target. A phase shift method and a stereo matching method can be used as a specific method for obtaining a depth image. The camera 83 is a side view camera that images the component gripped by the robot hand 51 from the Y-direction, and is horizontally mounted on a base of the robot hand 51. This camera 83 captures a gray scale image (two-dimensional image) representing an imaging target (component) by a luminance. Further, the mass meter 85 measures the mass of the component placed in the compartmentalized storage 921 of the kitting tray 92.

FIG. 3 is a block diagram showing an example of the electrical configuration of the control device. The control device 3 is, for example, a personal computer provided with an arithmetic unit 31, a storage 35 and a UI (User Interface) 39. The arithmetic unit 31 is, for example, a processor provided with a CPU (Central Processing Unit) and the like and includes a main controller 311 and an image processor 4. These main controller 311 and image processor 4 are developed in the arithmetic unit 31 by implementing a predetermined program. The main controller 311 controls hardware including the aforementioned robot hand 51, cameras 81, 83 and mass meter 85, and the image processor 4 performs an image processing for recognizing the component supposed to be gripped by the robot hand 51. Particularly, the image processor 4 includes an image compositor 41, a patch image generator 43, an alignment network unit 45 and a grip classification network unit 47. Functions of these are described in detail later.

The storage 35 is a storage device such as a HDD (Hard Disk Drive) or SSD (Solid State Drive) and, for example, stores the program and data for developing the main controller 311 or the image processor 4 in the arithmetic unit 31. Further UI 39 includes an input device such as a keyboard or mouse and an output device such as a display, and transfers information input by an operator using the input device to the arithmetic unit 31 and the UI 39 and displays an image corresponding to a command from the arithmetic unit 31 on the display.

FIG. 4A is a flow chart showing an example of bin picking performed in the component gripping system of FIG. 1, FIG. 4B is a flow chart showing an example of a patch image processing performed in bin picking of FIG. 4A, FIG. 4C is a flow chart showing an example of grip reasoning performed in bin picking of FIG. 4A, and FIG. 4D is a flow chart showing an example of determination of the component to be gripped performed in the grip reasoning of FIG. 4C.

In Step S101 of bin picking of FIG. 4A, plan view images of a multitude of components piled up in the compartmentalized storages 911 of the component bin 91 are captured by the camera 81. A gray scale image Ig and a depth image Id are captured as the plan view images as described above. The main controller 311 transfers these images Id, Ig obtained from the camera 81 to the image compositor 41 of the image processor 4 and the image compositor 41 performs the patch image processing (Step S102).

Figure 5B:
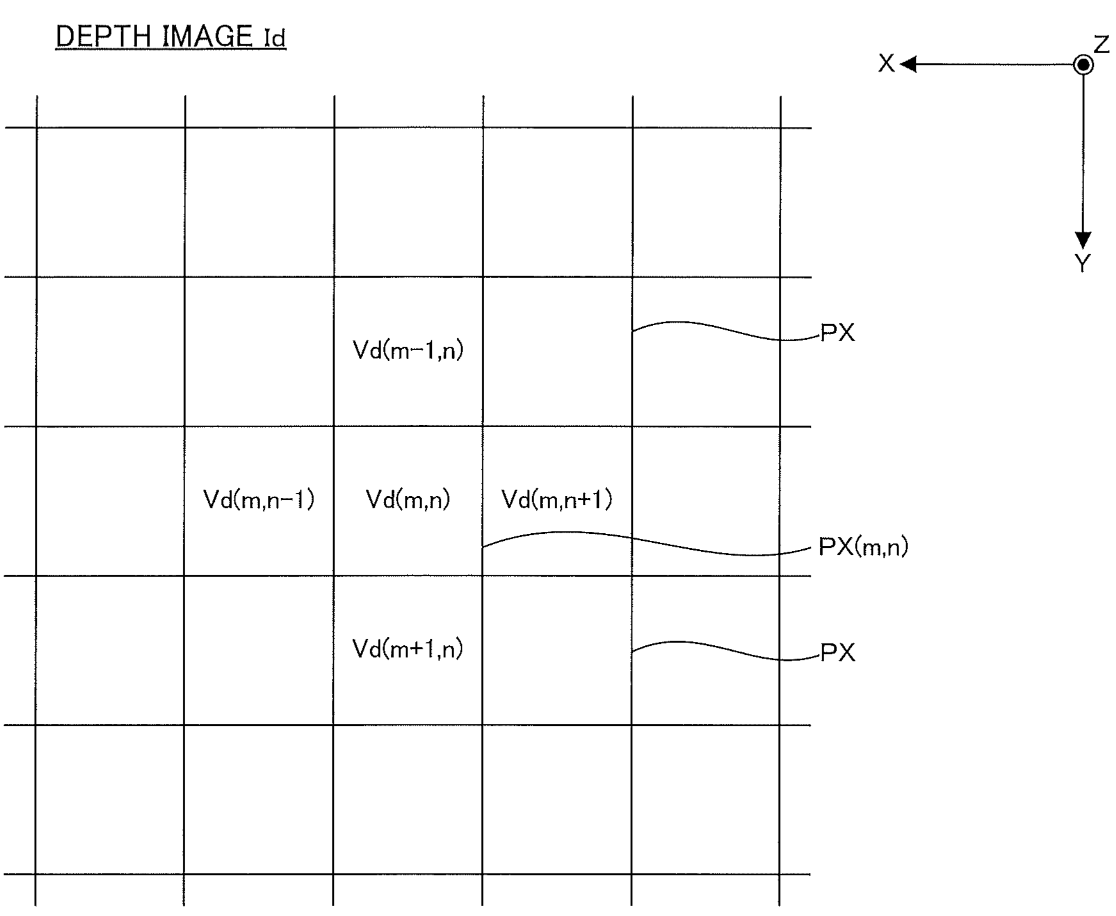
FIG. 5B is diagram schematically showing operations performed in the patch image processing of FIG. 4B.

FIGS. 5A to 5E are diagrams schematically showing operations performed in the patch image processing of FIG. 4B. In Step S201 of the patch image processing of FIG. 4B, the image compositor 41 generates a composite image Ic (FIG. 5C) by combining the gray scale image Ig (FIG. 5A) and the depth image Id (FIG. 5B).

As shown in FIG. 5A, the gray scale image Ig is image data composed of a plurality of pixels PX two-dimensionally arrayed in the X-direction and Y-direction and representing a luminance Vg of the pixel PX for each of the plurality of pixels PX. Note that, in FIG. 5A, notation is used which specifies one pixel PX by a combination (m, n) of "m" indicating a row number and "n" indicating a column number, and the pixel PX(m, n) of the gray scale image Ig has the luminance Vg(m, n). Note that the luminance Vg(m, n) has a larger value as a corresponding part is brighter.

As shown in FIG. 5B, the depth image Id is image data composed of a plurality of pixels PX similarly to the gray scale image Ig and representing a depth (distance) of the pixel PX for each of the plurality of pixels PX. Also in FIG. 5B, notation similar to that of FIG. 5A is used and the pixel PX(m, n) of the depth image Id has a depth Vd(m, n). Note that the depth Vd(m, n) has a larger value as a depth at a corresponding part is shallower (in other words, as the position of the facing part is higher).

Figure 5C:
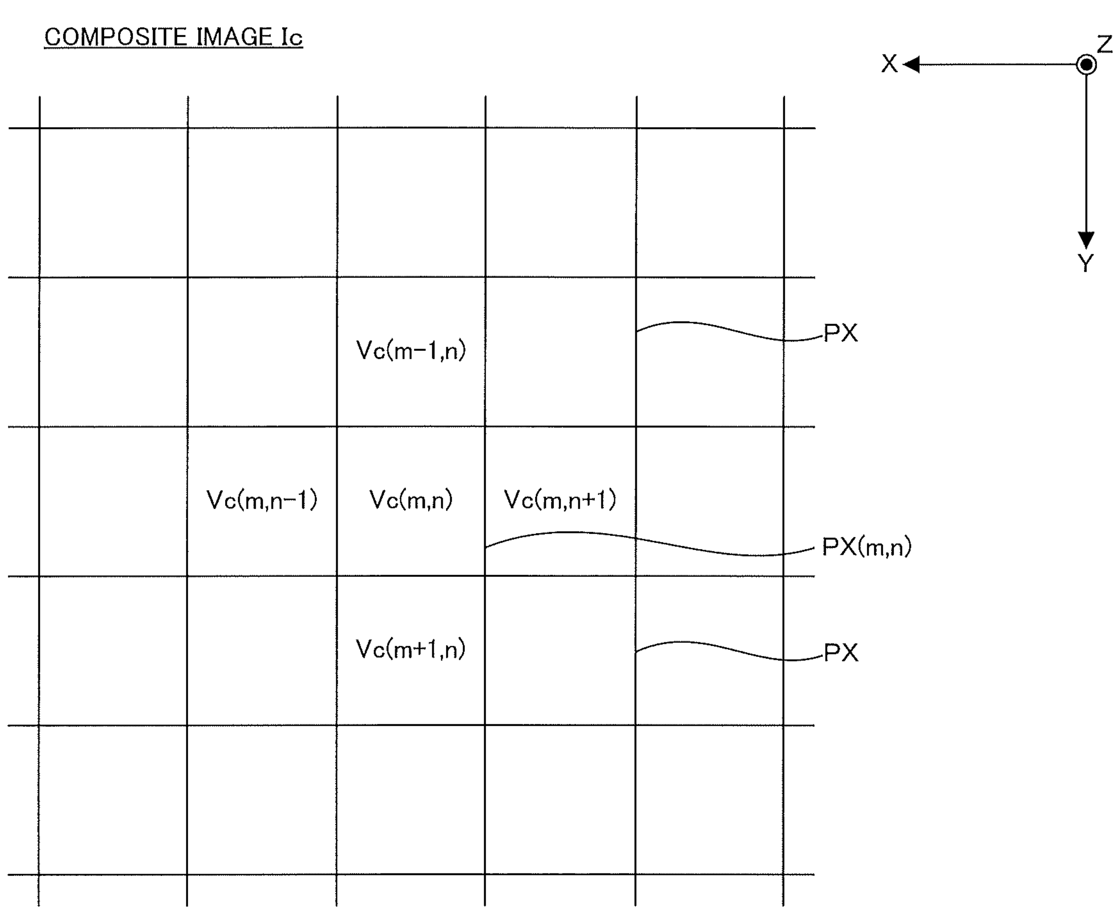
FIG. 5C is diagram schematically showing operations performed in the patch image processing of FIG. 4B.

As shown in FIG. 5C, the composite image Ic is image data composed of a plurality of pixels PX similarly to the gray scale image Ig and representing a composite value Vc of the pixel PX for each of the plurality of pixels PX. Also in FIG. 5C, notation similar to that of FIG. 5A is used and the pixel PX(m, n) of the composite image Ic has a composite value Vc(m, n).

Such a composite value Vc(m, n) is calculated based on the following equation:

$$Vc(m,n)=Vd(m,n)x(1+Vg(m,n)/\max(Vg))$$

where max(Vg) is a maximum luminance among the luminances Vg included in the gray scale image Ig. That is, the composite value Vc is the luminance Vg weighted by the depth Vd and the composite image Ic is a depth-weighted gray scale image. Note that, in the above equation, the luminance Vg normalized at the maximum luminance is multiplied by the depth Vd (weight). However, normalization is not essential and the composite value Vc may be calculated by multiplying the luminance Vg by the depth Vd (weight). In short, the composite value Vc may be determined to depend on both the luminance Vg and the depth Vd.

In FIG. 5D, an experimental result of generating the composite image Ic from the gray scale image Ig and the depth image Id is shown. The gray scale image Ig (before filtering) is two-dimensional image data obtained by the camera 81, and the gray scale image Ig (after filtering) is two-dimensional image data having predetermined components (high-frequency components) of the two-dimensional image data obtained by the camera 81 removed by filtering. Further, the depth image Id (before filtering) is the three-dimensional image data obtained by the camera 81, and the depth image Id (after filtering) is three-dimensional image data having predetermined components (high-frequency components) of the three-dimensional image data obtained by the camera 81 removed by filtering. The composite image Ic is a depth-weighted gray scale image obtained by combining the gray scale image Ig and the depth image Id after filtering by the above equation. Here, if a range (elliptical range) designated by an arrow in each of fields of the "gray scale image Ig (after filtering)" and the "composite image Ic" is focused, the component clearly shown in the gray scale image Ig (after filtering) is not shown in the composite image Ic. This results from the fact that this component had a deep depth (in other words, low in height) and a small weight was given to the luminance Vg of this component. As just described, the combination of the gray scale image Ig and the depth image Id has an effect of emphasizing the component at a high position. Note that filtering used in FIG. 5D is not essential and similar effects can be obtained even if filtering is omitted as appropriate.

Figure 5E:
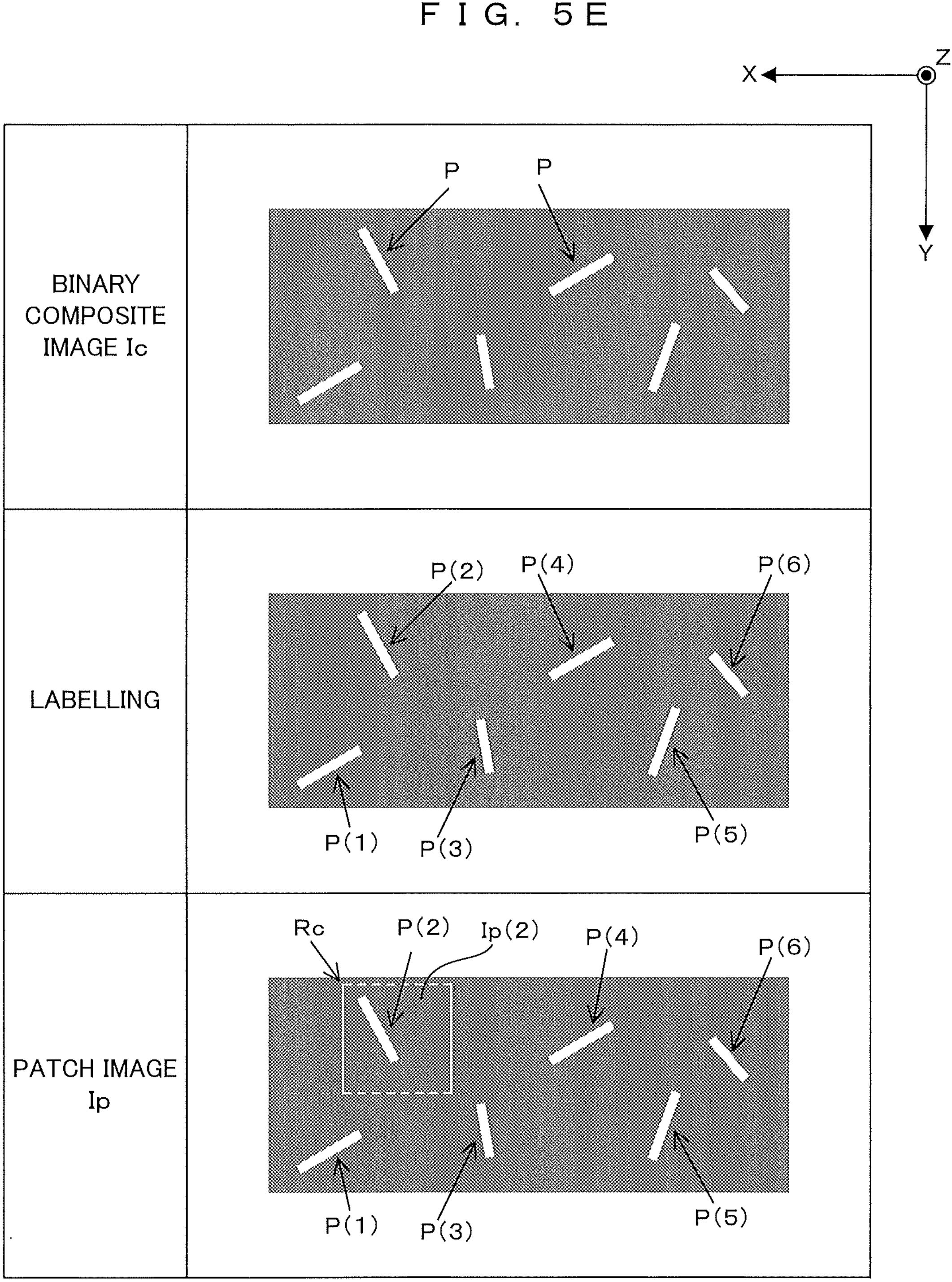
FIG. 5E is diagram schematically showing operations performed in the patch image processing of FIG. 4B.

The composite image Ic generated in Step S201 of FIG. 4B is output from the image compositor 41 to the patch image generator 43, and the patch image generator 43 performs image processings of Step S202 to S204 for the composite image Ic. Specific contents of these image processings are illustrated in FIG. 5E. In Step S202, a binary composite image Ic is obtained by binarizing the composite image Ic by a predetermined threshold. In this binary composite image Ic, a closed region having a high luminance (white) appears to correspond to the component. In other words, the closed region in the binary composite image Ic can be recognized as a component P. In Step S203, the patch image generator 43 performs labelling to associate mutually different labels (numbers) with the respective components P (closed regions Rc) of the binary composite image Ic.

In Step S204, a cutting range Rc for cutting an image including the component P from the binary composite image Ic is set. Particularly, the cutting range Rc is set to show the position of the robot hand 51 in gripping the component P. This cutting range Rc is equivalent to a range to be gripped by the robot hand 51 (range to be gripped), and the robot hand 51 can grip the component P present in the cutting range Rc. For example, in field "Patch Image Ip" of FIG. 5E, parts corresponding to the two claws 511 of the robot hand 51 facing the component P (2) from above to grip the component P are represented by white solid lines (parallel to the Y-direction) of the cutting range Rc and movement paths of both ends of each claw 511 are represented by white broken lines (parallel to the X-direction). As is understood from this example, the claws 511 are parallel to the Y-direction and an angle of rotation of the robot hand 51 in the θ-direction is zero. That is, the cutting range Rc is set in a state where the angle of rotation of the robot hand 51 in the θ-direction is zero. Then, the patch image generator 43 acquires an image within the cutting range Rc as a patch image Ip from the binary composite image Ic (patch image generation). This patch image Ip is generated for each component P labelled in Step S203.

Figure 6C:
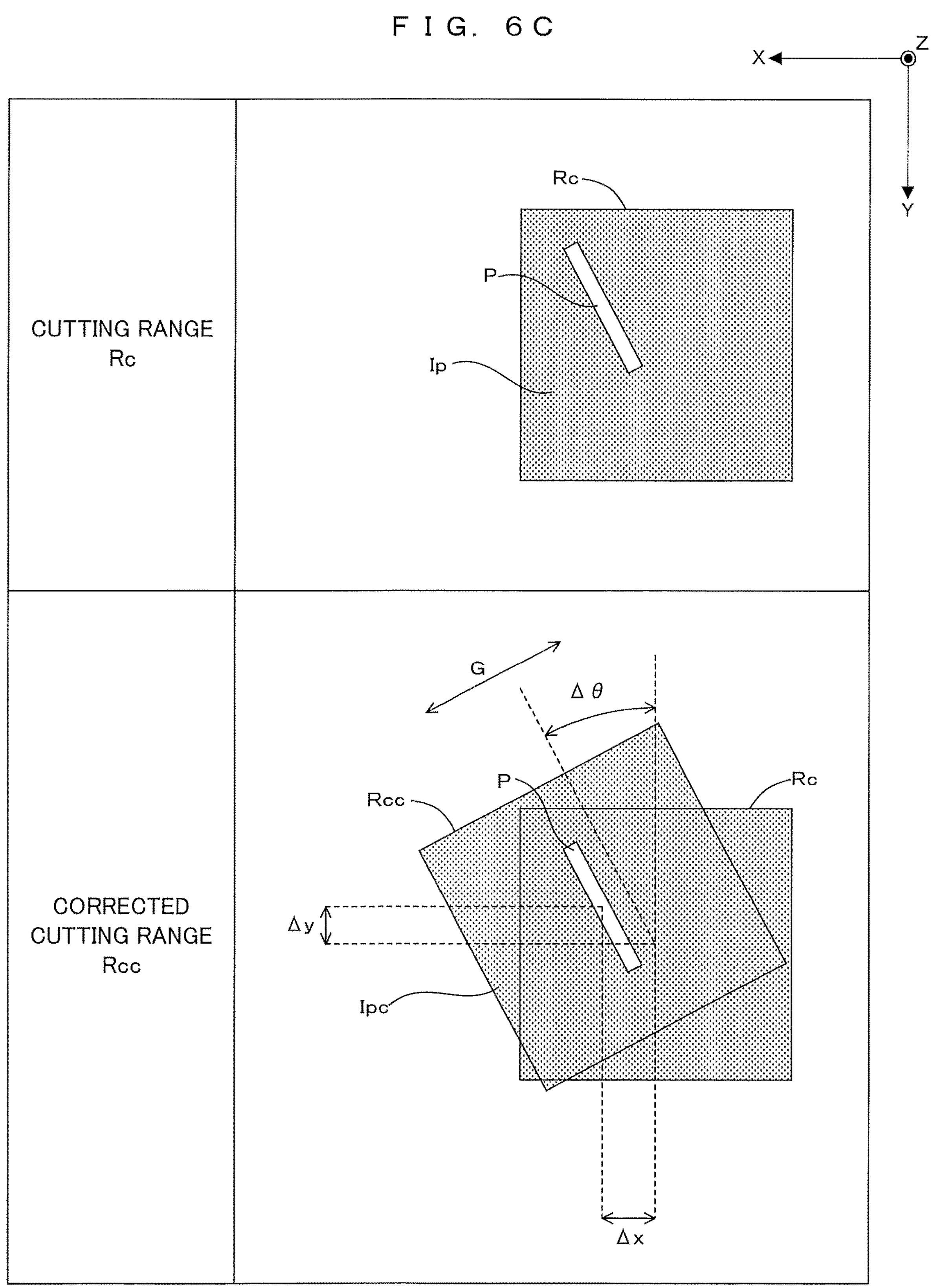
FIG. 6C is diagram schematically showing operations performed in the grip reasoning of FIG. 4C.

As shown in FIG. 4A, if the patch image processing of Step S102 is completed, the grip reasoning (FIG. 4C) of Step S103 is performed. FIGS. 6A to 6C and 7 are diagrams schematically showing operations performed in the grip reasoning of FIG. 4C. In starting the grip reasoning of FIG. 4C, patch image information (FIG. 6A) representing a plurality of the patch images Ip acquired by the patch image processing in Step S102 is output from the image compositor 41 to the alignment network unit 45. As shown in FIG. 6A, the patch image information represents the patch image Ip, the label number of this patch image Ip and the position of the cutting range Rc of this patch image Ip in association. The shape of the cutting range Rc is same for each patch image Ip, and the position of the cutting range Rc (cutting position) is specified by an X-coordinate, a Y-coordinate and a θ-coordinate of a geometric centroid of the cutting range Rc.

In contrast, in Step S301 of FIG. 4C, the alignment network unit 45 resets a count value for counting the labels of the plurality of patch images Ip represented by the patch image information to zero (Step S301) and increments this count value (Step S302).

In Step S303, the alignment network unit 45 determines whether or not an area of an object (white closed region) included in the patch image Ip of the current count value is proper. Specifically, the object area is compared to each of a lower threshold and an upper threshold larger than the lower threshold. If the object area is smaller than the lower threshold or larger than the upper threshold, the object area is determined not to be proper ("NO" in Step S303) and return is made to Step S302. On the other hand, if the object area is equal to or larger than the lower threshold and equal to or lower than the upper threshold, the object area is determined to be proper ("YES" in Step S303") and advance is made to Step S304.

In Step S304, the alignment network unit 45 calculates a correction amount for correcting the position of the cutting range Rc based on the patch image Ip of the current count value. That is, the alignment network unit 45 includes an alignment neural network, and this alignment neural network outputs the correction amount (Δx, Δy, Δθ) of the cutting range Rc if the patch image Ip is input. A relationship of the patch image Ip and the correction amount of the cutting range Rc is described using FIG. 6C.

In field "Cutting Range Rc" of FIG. 6C, the cutting range Rc and the patch image Ip cut within the cutting range Rc are shown. In field "Corrected Cutting Range Rcc", a corrected cutting range Rc obtained by correcting the position of the cutting range Rc according to the correction amount (Δx, Δy, Δθ) is shown to be superimposed on the cutting range Rc and the patch image Ip. The cutting range Rc and the corrected cutting range Rcc have the same shape, and the cutting range Rc having each of the following operations performed therefor coincides with the corrected cutting range Rcc: Parallel movement in the X-direction by a correction distance Δx . . . X-direction parallel operation: Parallel movement in the Y-direction by a correction distance Δy . . . Y-direction parallel operation; and Rotational movement in the θ-direction by a correction angle Δθ . . . θ-direction rotation operation.

Further, a misalignment between a center of the corrected cutting range R and the component P is improved as compared to a misalignment between a center of the cutting range Rc and the component P. That is, the correction of the cutting range Rc is a correction for improving the misalignment between the cutting range Rc and the component P and further a correction for converting the cutting range Rc into the corrected cutting range Rcc so that the component P is centered. In response to the input of the patch image Ip, the alignment neural network of the alignment network unit 45 outputs the correction amount (Δx, Δy, Δθ) for correcting the cutting range Rc of this patch image Ip and calculating the corrected cutting range Rcc. Incidentally, a calculation of correcting the cutting range Rc by this correction amount and converting the cutting range Rc into the corrected cutting range Rcc can be performed by a product of a rotation matrix for rotating the cutting range Rc by Δθ in the θ-direction and a translation matrix for parallelly moving the cutting range Rc by Δy in the Y-direction while parallelly moving the cutting range Rc by Δx in the X-direction. Further, if the enlargement or reduction of the image needs to be considered, a scaling matrix may be further multiplied.

Note that if the component P has a shape long in a predetermined direction as in an example of FIG. 6C, it is preferable to perform centering such that a long axis direction of the component P is orthogonal to the gripping direction G of the robot hand 51. In this way, the component P can be precisely gripped by the robot hand 51.

In Step S305, the alignment network unit 45 generates the corrected cutting range Rcc by correcting the cutting range Rc based on the correction amount output by the alignment neural network and acquires an image within the corrected cutting range Rcc from the binary composite image Ic, as a corrected patch image Ipc (corrected patch image generation). Steps S302 to S305 are repeated until Steps S302 to S305 are completed for all the labels (in other words, all the patch images Ip) included in the patch image information (unit "YES" in Step S306).

If the correction is completed for all the labels, corrected patch image information (FIG. 6B) representing a plurality of the corrected patch images Ipc is output from the alignment network unit 45 to the grip classification network unit 47. As shown in FIG. 6B, the corrected patch image information represents the corrected patch image Ipc, the label number of this corrected patch image Ipc and the position of the corrected cutting range Rcc of this corrected patch image Ipc in association. The shape of the corrected cutting range Rcc is same for each corrected patch image Ipc, and the position of the corrected cutting range Rc (cutting position) is specified by an X-coordinate, a Y-coordinate and a θ-coordinate of a geometric centroid of the corrected cutting range Rc.

In Step S307, the grip classification network unit 47 calculate a grip success probability for each of the plurality of corrected patch images Ipc represented by the corrected patch image information. Specifically, a success probability (grip success probability) in the case of trying to grip the component P represented by the corrected patch image Ipc cut in the corrected cutting range Rcc with the robot hand 51 located at the position (x+Δx, y+Δy, θ+Δθ) of the corrected cutting range Rcc is calculated. That is, the grip classification network unit 47 includes a grip classification neural network and this grip classification neural network outputs the grip success probability corresponding to the corrected patch image Ipc if the corrected patch image Ipc is input. In this way, grip success probability information shown in FIG. 7 is acquired. As shown in FIG. 7, the grip success probability information represents the corrected patch image Ipc, the label number of this corrected patch image Ipc, the position of the corrected cutting range Rcc of this corrected patch image Ipc and the grip success probability of this corrected patch image Ipc in association. Note that the grip success probability is represented by a value of 0 to 1 in an example of FIG. 7, but may be represented in percentage.

In Step S308, the main controller 311 determines the component P to be gripped based on the grip success probability information output from the grip classification network unit 47. In the determination of the component to be gripped of FIG. 4D, the respective corrected patch images Ipc of the grip success probability information are sorted in a descending order according to the grip success probability (Step S401). That is, the corrected patch image Ipc having a higher grip success probability is sorted in higher order.

Further, for the corrected patch images Ipc having the same grip success probability, the corrected patch images Ipc are sorted in a descending order according to the object area included in the corrected patch image Ipc. That is, the corrected patch image Ipc having a larger object area is sorted in higher order. A count value of a sorting order is reset to zero in Step S403, and this count value is incremented in Step S404.

In Step S405, it is determined whether or not the component P included in the corrected patch image Ipc of the current count value is close to an end of the compartmentalized storage 911 (container) of the component bin 91. Specifically, the component P is determined to be close to the end of the container ("YES" in Step S405) if a distance between the position of the corrected cutting range Rcc, from which the corrected patch image Ipc was cut, and a wall surface of the compartmentalized storage 911 is less than a predetermined value, and return is made to Step S404. On the other hand, if this distance is equal to or more than the predetermined value, the component P is determined not to be close to the end of the container ("NO" in Step S405) and advance is made to Step S406. In Step S406, the corrected patch image Ipc of the current count value is selected as one corrected patch image Ipc representing the component P to be gripped. Then, return is made to the flow chart of FIG. 4A.

In Step S104 of FIG. 4A, the robot hand 51 is moved to the position represented by the corrected cutting range Rcc corresponding to the one corrected patch image Ipc selected in Step S103, and grips the component P represented by the one corrected patch image Ipc. An image of the component P gripped by the robot hand 51 is captured by the camera 83 in Step S105, and the main controller 311 determines the component P gripped by the robot hand 51 from the image captured by the camera 83 in Step S106. Further, the main controller 311 determines whether or not the number of the gripped component P is 1 (Step S107). If the number is not 1 ("NO" in Step S107), the robot hand 51 is caused to return these components P to the compartmentalized storage 911 of the component bin 91 (Step S108). Further, if the number of the gripped component P is 1 ("YES" in Step S107), the main controller 311 determines whether or not the gripped component P is normal (Step S109). If there is an abnormality such as a too small area representing the component P ("NO" in Step S109), the robot hand 51 is caused to discard this component P into the trash can 93 (Step S110).

On the other hand, if the component P is normal ("YES" in Step S109), the main controller 311 causes the robot hand 51 to place this component P in the compartmentalized storage 921 of the kitting tray 92 (Step S111). Subsequently, the main controller 311 measures the mass by the mass meter 85 (Step S112) and determines whether or not the mass indicated by the mass meter 85 is proper (Step S113). Specifically, determination can be made based on the mass corresponding to the components P placed on the kitting tray 92 is increasing. The main controller 311 notifies abnormality to the operator using the UI 39 if the mass is not proper ("NO" in Step S113), whereas the main controller 311 returns to Step S101 if the mass is proper ("YES" in Step S113).

The above is the content of bin picking performed in the component gripping system 1. In the above grip reasoning, the alignment network unit 45 calculates the correction amount (Δx, Δy, Δθ) for correcting the cutting range Rc based on the patch image Ip cut from the cutting range Rc. Particularly, the alignment network unit 45 calculates the correction amount of the cutting range Rc from the patch image Ip using the alignment neural network. Next, a method for causing this alignment neural network to learn the relationship of the patch image Ip and the correction amount of the cutting range Rc is described.

FIG. 8A is a flow chart showing an example of a method for collecting learning data of the alignment neural network. This flow chart is performed by the arithmetic unit 31 of the control device 3. In performing this flow chart, a simulator for performing bin picking in a component gripping system 1 (hereinafter, referred to as a "virtual component gripping system 1" as appropriate) virtually constructed by calculation is constructed in the arithmetic unit 31. This simulator virtually performs an operation of the robot hand 51 to grip the component P from the compartmentalized storage 911 of the component bin 91 by calculation based on physical parameters such as a gravity acceleration and a friction coefficient.

In Step S501, it is confirmed whether or not a necessary number of pieces of data for learning has been acquired. This necessary number can be, for example, set in advance by the operator. The flow chart of FIG. 8A is finished if this necessary number of pieces of data have been already acquired ("YES" in Step S501), whereas advance is made to Step S502 if the number of acquired pieces of data is less than the necessary number ("NO" in Step S501).

In Step S502, it is determined whether or not sufficient components P are stored in the compartmentalized storage 911 of the component bin 91 arranged in the virtual component gripping system 1. Specifically, determination can be made based on whether or not the number of the components P is equal to or more than a predetermined number. If the number of the components P in the compartmentalized storage 911 of the component bin 91 is less than the predetermined number ("NO" in Step S502), the number of the components P in the compartmentalized storage 911 of the component bin 91 is increased to an initial value by being reset (Step S503) and return is made to Step S501. On the other hand, if the number of the components P in the compartmentalized storage 911 of the component bin 91 is equal to or more than the predetermined number ("YES" in Step S502), advance is made to Step S504.

In Step S504, a composite image Ic is generated in the virtual component gripping system 1 as in the case of the aforementioned real component gripping system 1. Subsequently, a binary composite image Ic is generated by binarizing this composite image Ic and labelling is performed for each component P included in this binary composite image Ic (Step S505). Then, a cutting range Rc is set for each of the labeled components P, and a patch image Ip is cut (Step S506).

A count value of counting the respective patch images Ip is reset in Step S507, and the count value is incremented in Step S508. Then, in a manner similar to the above, it is determined whether or not an area of an object (white closed region) included in the patch image Ip of the current count value is proper (Step S509). Return is made to Step S508 if the area of the object is improper ("NO" in Step S509), whereas advance is made to Step S510 if the area of the object is proper ("YES" in Step S509).

If one patch image Ip having a proper area of the object is selected in this way, the main controller 311 generates a position determination mask Mp (FIG. 8B) from this one patch image Ip (Step S510). FIG. 8B is a diagram schematically showing an example of the position determination mask generated from the patch image. This position determination mask Mp has a contour having the same shape as the patch image Ip (in other words, the cutting range Rc), and a component reference pattern Pr having the same shape as the component P included in the patch image Ip is arranged in a center of the position determination mask Mp. This component reference pattern Pr is generated to have a pixel number in each of vertical and horizontal directions of the component P (in other words, the white closed region) included in the patch image Ip. This position determination mask Mp is a model of an ideal patch image Ip having the component P located in the center. Then, the patch image Ip is associated with the position determination mask Mp generated from this patch image Ip and stored in a patch image list (Step S511).

If the respective Steps up to Step S511 are completed in this way, return is made to Step S501. Steps S501 to S511 are repeatedly performed until the necessary number of pieces of data are acquired, i.e. until the number of pairs of the patch image Ip and the position determination mask Mp stored in the patch image list reaches the necessary number.

Figure 9A:
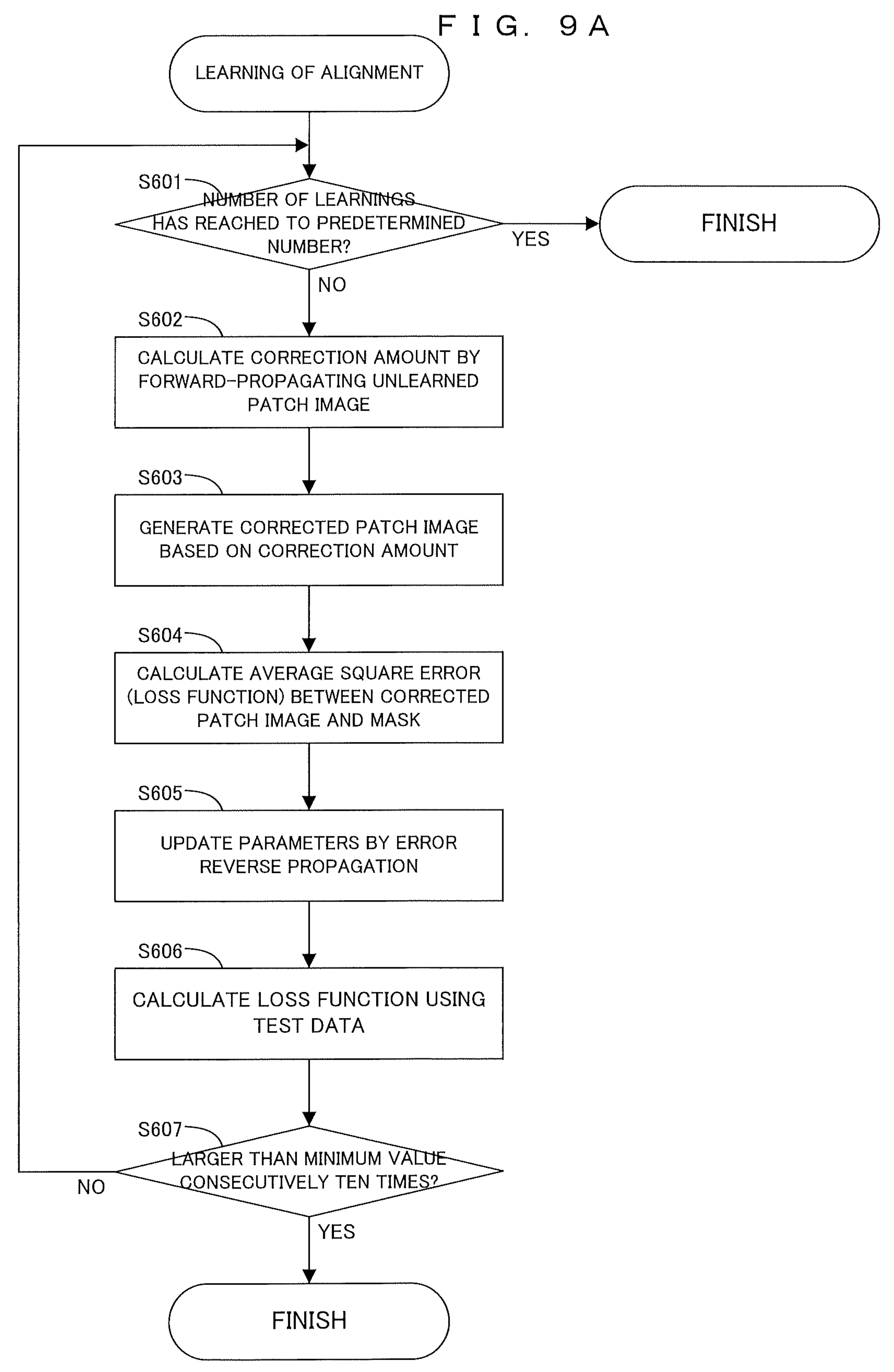
FIG. 9A is an example of a flow chart for causing the alignment neural network to learn the learning data collected in FIG. 8A.

FIG. 9A is an example of a flow chart for causing the alignment neural network to learn the learning data collected in FIG. 8A. This flow chart is performed by the arithmetic unit 31 of the control device 3. In Step S601, it is determined whether or not the number of learnings has reached a predetermined number. This predetermined number can be, for example, set in advance by the operator.

In Step S602, an unlearned patch image Ip selected from the patch image list is forward-propagated to the alignment neural network of the alignment network unit 45. Hereby, the correction amount ($\Delta x$, $\Delta y$, $\Delta\theta$) corresponding to the patch image Ip is output from the neural network of the alignment network unit 45. Further, the alignment network unit 45 generates a corrected patch image Ipc by cutting the binary composite image Ic (generated in Step S505) within the corrected cutting range Rcc obtained by correcting the cutting range Rc by this correction amount (Step S603).

In Step S604, the alignment network unit 45 overlaps the position determination mask Mp corresponding to the patch image Ip selected in Step S602 and the corrected patch image Ipc such that the contours thereof coincide, and calculates an average square error between the component reference pattern Pr of the position determination mask Mp and the component P included in the corrected patch image Ipc as a loss function. Then, in Step S605, this loss function is back-propagated in the alignment neural network (error back propagation), thereby updating parameters of the alignment neural network.

Figure 9B:
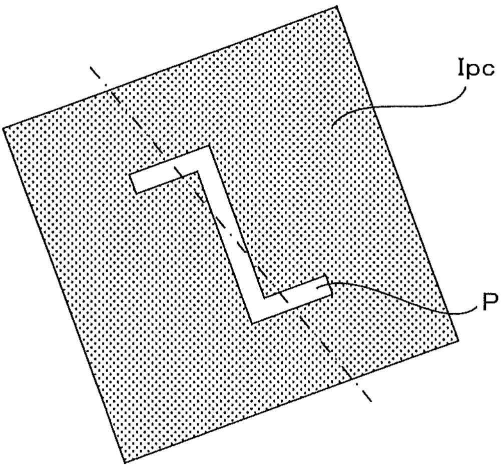
FIG. 9B is a diagram schematically showing an example in which the use of the mask is advantageous in calculating the loss function.

Note that the loss function can be calculated even without using the position determination mask Mp. That is, a main axis angle may be calculated from a moment of the image of the component P and an average square error between this main axis angle and a predetermined reference angle may be set as the loss function. On the other hand, in a case illustrated in FIG. 9B, the use of the position determination mask Mp is advantageous. FIG. 9B is a diagram schematically showing an example in which the use of the mask is advantageous in calculating the loss function. A component P included in a corrected patch image Ipc shown in FIG. 9B has a zigzag shape and it is difficult to properly obtain a main axis angle from a moment of an image of this component P. Therefore, the position determination mask Mp is used here from the perspective of dealing with components P of various shapes.

In Step S606, the patch image Ip (test data) secured for test in advance and not used in learning among the patch images Ip stored in the patch image list, is forward-propagated to the alignment neural network having the parameters updated, whereby the correction amount is calculated. Then, based on this correction amount, the loss function is calculated using the position determination mask Mp corresponding to this test data in the same manner as in Steps S603 to S604 described above.

The arithmetic unit 31 stores the loss function calculated in Step S606 every time Step S606 is performed, and calculates a minimum value of a plurality of the loss functions stored in this way. Then, the arithmetic unit 31 confirms whether the recently calculated loss function have updated the minimum value. Particularly, in Step S607, it is determined whether the minimum value has not been updated, i.e. whether the loss function larger than the minimum value has been calculated consecutively ten times. Return is made to Step S601 if the loss function equal to or less than the minimum value has been calculated in the past ten times ("NO" in Step S607), whereas the flow chart of FIG. 9A is finished if the loss function larger than the minimum value has been calculated consecutively ten times ("YES" in Step S607). Note that the number of times is not limited to ten times and can be changed as appropriate if necessary.

In the above grip reasoning, if the corrected patch image Ipc is input to the grip classification network unit 47, the grip classification network unit 47 calculates the grip success probability in the case of gripping the component P included in the corrected patch image Ipc by the robot hand 51 at the position represented by the corrected patch image Ipc. Particularly, the grip classification network unit 47 calculates the grip success probability from the corrected patch image Ipc, using the grip classification neural network. Next, a method for causing the grip classification neural network to learn a relationship of the corrected patch image Ipc and the grip success probability is described.

Figure 10A:
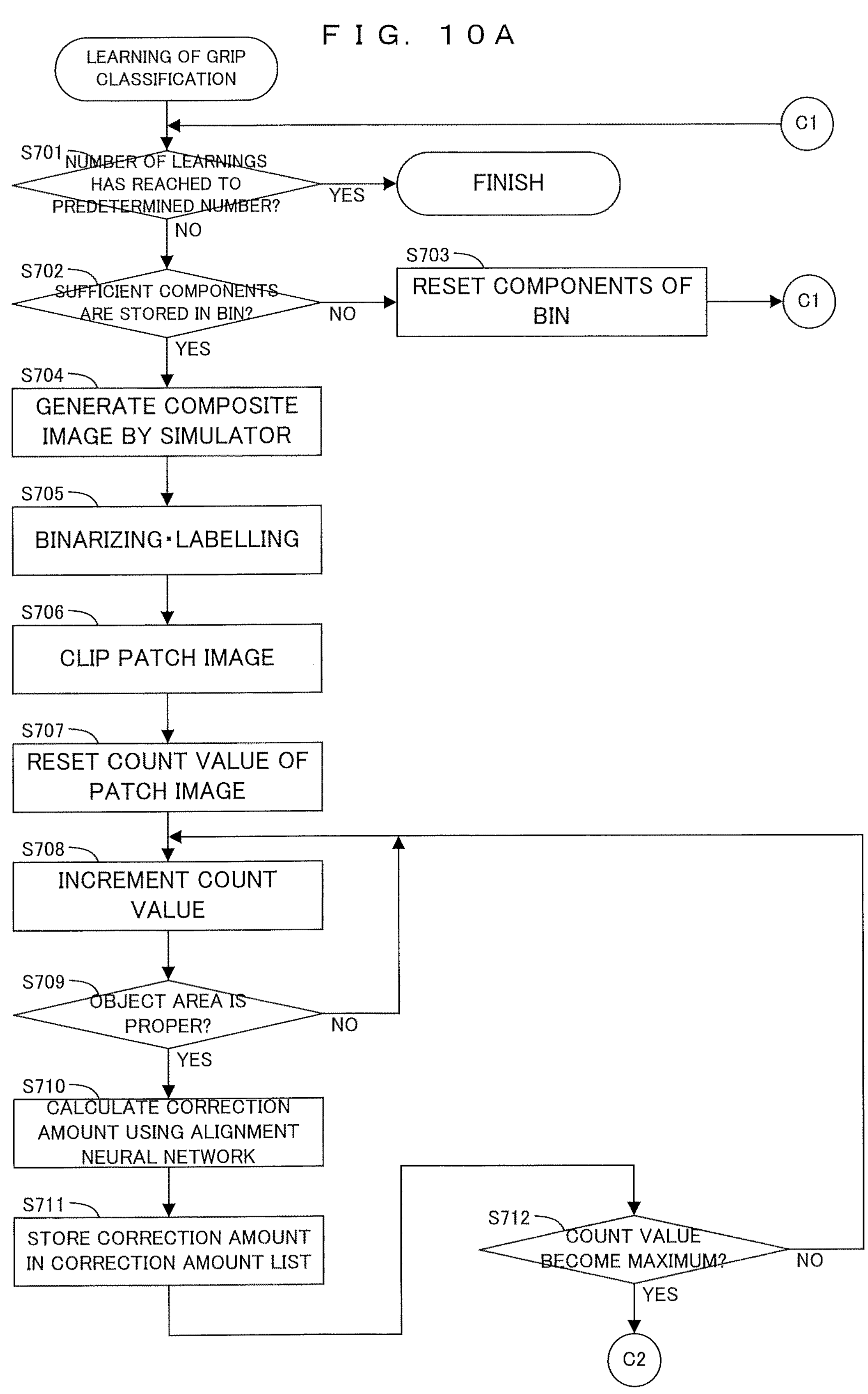
FIG. 10A is an example of a flow chart for causing the grip classification neural network to learn.
Figure 10B:
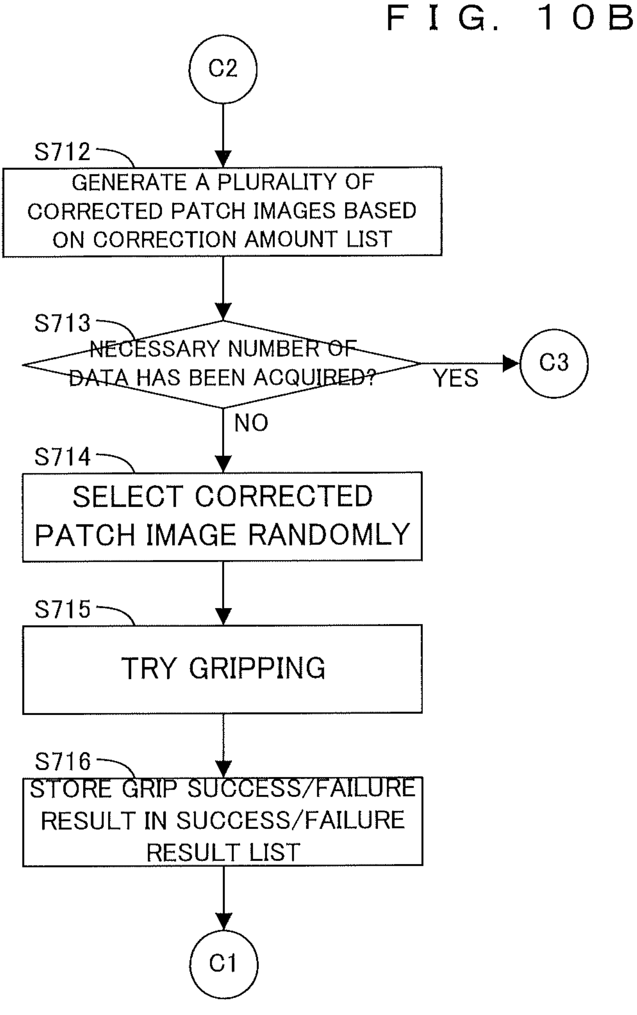
FIG. 10B is an example of a flow chart for causing the grip classification neural network to learn.

FIGS. 10A to 10C are an example of a flow chart for causing the grip classification neural network to learn. This flow chart is performed by the arithmetic unit 31 of the control device 3. Also in the learning of the grip classification neural network, a simulator for constructing a virtual component gripping system 1 is used as in the learning of the above alignment neural network.

In the flow chart of FIG. 10A, learning data is collected as in that of FIG. 8A. That is, Steps S701 to S709 of FIG. 10A are similar to Steps S501 to S509 of FIG. 8A except the following point. That is, in Step S701, not the acquired number of pieces of data, but whether or not the number of learnings has reached a predetermined number, is determined in Step S701. This predetermined number can be, for example, set in advance by the operator.

In the flow chart of FIG. 10A, if an one patch image Ip having a proper object area is selected by performing Steps S701 to S709, the alignment network unit 45 calculates a correction amount corresponding to the patch image Ip using the above learning completed alignment neural network (Step S710) and stores the patch image Ip and the correction amount in association in a correction amount list (Step S711). Steps S708 to S711 are repeated until a count value becomes maximum (until "YES" in Step S712), and pairs of the patch image Ip and the correction amount are successively stored in the correction amount list. If the count value becomes maximum ("YES" in Step S712), advance is made to Step S712 of FIG. 10B.

In Step S712, the alignment network unit 45 performs a process, which generates a corrected cutting range Rcc by correcting the cutting range Rc of the patch image Ip based on the correction amount and generates a corrected patch image Ipc based on the corrected cutting range Rcc, for each pair of the patch image Ip and the correction amount stored in the correction amount list. Hereby, a plurality of the corrected patch images Ipc are generated. Note that a specific procedure of generating the corrected patch image Ipc is as described above.

In Step S713, it is confirmed whether or not a necessary number of pieces of data for learning has been acquired. This necessary number can be, for example, set in advance by the operator. Advance is made to Step S717 to be described later (FIG. 10C) if this necessary number of pieces of data have been already acquired ("YES" in Step S713), whereas advance is made to Step S714 if the number of acquired pieces of data is less than the necessary number ("NO" in Step S713).

In Step S714, one corrected patch image Ipc is randomly (e.g. based on an output of a random number generator) is selected, out of a plurality of the corrected patch images Ipc generated in Step S712. Then, in Step S715, the grip of the component P included in the one corrected patch image Ipc is tried by the robot hand 51 located at the position of this one corrected patch image Ipc in the virtual component gripping system 1. Note that the position of the corrected patch image Ipc is equivalent to the position of the corrected cutting range Rcc, from which this corrected patch image Ipc was cut. Then, a success/failure result (1 in the case of a success, 0 in the case of a failure) of the grip trial is stored in a success/failure result list in association with the one corrected patch image Ipc (Step S716) and return is made to Step S701 of FIG. 10A.

On the other hand, if it is determined that the necessary number of pieces of data have been already acquired (YES) in Step S713, advance is made to Step S717 of FIG. 10C as described above. In Step S717, a laterally inverted corrected patch image Ipc obtained by laterally inverting the corrected patch image Ipc, a vertically inverted corrected patch image Ipc obtained by vertically inverting the corrected patch image Ipc and a vertically and laterally inverted corrected patch image Ipc obtained by laterally and vertically inverting the corrected patch image Ipc are generated. In this way, three types of images including the laterally inverted patch image Ipc, the vertically inverted patch image Ipc and the vertically and laterally inverted patch image Ipc are prepared for each corrected patch image Ipc in the success/failure result list. That is, three times as many corrected patch images Ipc as the corrected patch images Ipc stored in the success/failure result list are prepared.

In Step S718, each of the plurality of corrected patch images Ipc generated in Step S717 is forward-propagated in the grip classification neural network of the grip classification network unit 47 and a grip success probability is calculated for each corrected patch image Ipc. Then, in Step S719, an average value of grip success probabilities of the laterally inverted patch image Ipc, the vertically inverted patch image Ipc and the vertically and laterally inverted patch image Ip generated from the same corrected patch image Ipc is calculated. In this way, the average value of the grip success probabilities is calculated for each corrected patch image Ipc stored in the success/failure result list.

In Step S720, one value, out of "0", "1" and "2", is generated by a random number generator. If "0" is obtained by the random number generator, one corrected patch image Ipc is randomly selected, out of the respective corrected patch images Ipc having the grip success probabilities calculated therefor in Step S719 (Step S721). If "1" is obtained by the random number generator, one corrected patch image Ipc having the grip success probability closest to "0.5" (in other words, 50%) is selected, out of the respective corrected patch images Ipc (Step S722). If "2" is obtained by the random number generator, one corrected patch image Ipc having the highest grip success probability is selected, out of the respective corrected patch images Ipc (Step S723).

In Step S724, the grip of the component P represented by the one corrected patch image Ipc is tried by the robot hand 51 located at the position of this one corrected patch image Ipc in the virtual component gripping system 1. Then, a loss function is calculated based on the success/failure result (1 in the case of a success, 0 in the case of a failure) of the component grip and the average value of the grip success probabilities calculated for the one corrected patch image Ipc in Step S719. Various known functions such as a cross-entropy error can be used as the loss function.

The arithmetic unit 31 stores the loss function calculated in Step S725 every time Step S725 is performed, and calculates a minimum value, out of a plurality of the loss functions stored in this way. Then, the arithmetic unit 31 confirms whether the recently calculated loss function have updated the minimum value. Particularly, in Step S726, it is determined whether the minimum value has not been updated, i.e. whether the loss functions larger than the minimum value have been calculated consecutively ten times. If the loss function equal to or less than the minimum value has been calculated in the past ten times ("NO" in Step S726), the grip success/failure result of Step S724 is stored in the success/failure result list in association with the one corrected patch image Ipc (Step S727). Then, in Step S728, the loss function calculated in Step S725 is back-propagated in the grip classification neural network (error back propagation), whereby the parameters of the grip classification neural network are updated. On the other hand, if the loss function larger than the minimum value has been calculated consecutively ten times ("NO"), return is made to Step S701 of FIG. 10A. Note that the number of times is not limited to ten times and can be changed as appropriate if necessary.

In the embodiment described above, the composite image Ic is generated by combining the gray scale image Ig (luminance image) and the depth image Id respectively representing the plurality of components (Step S201). In the thus generated composite image Ic, the shape of the component P at a relatively high position among the plurality of components P easily remains, and the composite image Ic is useful in confirming such a component P.

Further, the robot hand 51 grips the component P based on such a confirmation result of the component P (Step S104). Therefore, the component can be gripped by the robot hand 51 with a high success probability.

Further, the gray scale image Ig represents the luminance Vg for each pixel PX, the depth image Id represents the depth Vd for each pixel PX, and the composite image Ic represents the composite value Vc for each pixel PX. Particularly, the image compositor 41 generates the composite image Ic by calculating the composite value Vc obtained by weighting the luminance Vg by the depth Vd. In the composite image Ic generated in this way, the shape of the component P at a relatively high position among the plurality of components P easily remains, and the composite image Ic is useful in confirming such a component P.

Further, the image compositor 41 generates the composite image Ic based on the following equation:

$$Vc = Vd \times (1 + Vg/\max(Vg))$$

where max(Vg) is a maximum value of the luminances Vg included in the gray scale image Ig. In the composite image Ic generated in this way, the shape of the component P at a relatively high position among the plurality of components P easily remains, and the composite image Ic is useful in confirming such a component P.

Further, a plurality of the corrected patch images Ipc representing mutually different components P are generated by setting the corrected cutting range Rcc (hand range) representing the range of the robot hand 51 for the component P in the composite image IC and cutting the corrected patch image Ipc (target component image) representing this component P included in the corrected cutting range Rcc from the composite image Ic (Steps S301 to S306). Further, the grip success probability in the case of trying to grip the component P by the robot hand 51 in the positional relationship of the robot hand 51 and the component P represented by the corrected patch image Ipc is calculated for each of the plurality of corrected patch images Ipc (Step S307). In the composite image Ic used at this time, the shape of the component P at a relatively high position easily remains as described above. Therefore, the corrected patch image Ipc including the component P at a relatively high position, in other words, the component having a relatively high grip success probability, can be reliably generated.

Further, based on the grip success probability calculated for each of the plurality of corrected patch images Ipc, one corrected patch image Ipc is selected among the plurality of corrected patch images Ipc and it is determined to grip the component P represented by the one corrected patch image Ipc by the robot hand 51 in a posture represented by the one corrected patch image Ipc (Steps S401 to S406). In such a configuration, a frequency of failure to grip the components P by the robot hand 51 can be suppressed.

Further, out of the corrected patch images Ipc not satisfying a predetermined exclusion condition (Step S405) among the plurality of corrected patch images Ipc, the corrected patch image Ipc having a highest grip success probability is selected as one corrected patch image Ipc (Steps S401 to S406). In such a configuration, the frequency of failure to grip the components P by the robot hand 51 can be reliably suppressed.

Specifically, the predetermined exclusion condition is that the distance between the end of the compartmentalized storage 911 (container) of the component bin 91 and the position of the corrected patch image Ipc is less than the predetermined value (Step S406). Hereby, the occurrence of a situation where the grip of the component P fails due to a wall surface at the end of the compartmentalized storage 911.

Further, the grip classification network unit 47 includes the grip classification neural network having learned the relationship of the corrected patch image Ipc and the grip success probability using a success/failure of the grip in the case of trying to grip the component P by the robot hand 51 in the positional relationship of the robot hand 51 and the component P represented by the corrected patch image Ipc as training data. The grip success probability is calculated for each of the plurality of corrected patch images Ipc by this grip classification neural network. In such a configuration, the frequency of failure to grip the component P by the robot hand 51 can be reliably suppressed, utilizing a learning result of the grip classification neural network.

Further, this embodiment can be said to be suitable for learning by such a grip classification neural network. That is, it is thought as an example of a learning method of the grip classification neural network to input both the gray scale image Ig and the depth image Id to the grip classification neural network and cause the grip classification neural network to learn a relationship of these images Ig, Id and the grip success probability. However, it is difficult for the grip classification neural network to learn the grip success probability of the robot hand 51 based on the association of the luminance of the component P represented by the gray scale image Ig and the height of the component P represented by the depth image Id and a computation load is also large. On the other hand, since the composite image Ic (corrected patch image Ipc) obtained by combining the gray scale image Ig and the depth image Id is input to the grip classification neural network in this embodiment, the grip classification neural network can learn based on this composite image Ic. As a result, learning can be relatively easily performed and the computation load can also be reduced.

Further, grip state information (side view image and mass of the component P) showing a state where the component P represented by one corrected patch image Ipc is actually gripped by the robot hand 51 in a posture represented by the one corrected patch image Ipc is acquired (Steps S105, S112). A success/failure of the grip of the component P by the robot hand 51 is determined based on this grip state information (Steps S107, S109, S113). In such a configuration, it can be confirmed whether or not the grip of the component P selected based on the grip success probability obtained for the corrected patch image Ipc has been actually succeeded.

As just described, in the above embodiment, the component gripping system 1 corresponds to an example of a "component gripping system" of the disclosure, the control device 3 corresponds to an example of an "image processing device" of the disclosure, the main controller 311 corresponds to an example of each of an "image acquirer" and a "success/failure determiner" of the disclosure, the image compositor 41 corresponds to an example of an "image compositor" of the disclosure, the patch image generator 43, the alignment network unit 45 and the grip classification network unit 47 cooperate to function as an example of a "success probability calculator" of the disclosure, the robot hand 51 corresponds to an example of a "robot hand" of the disclosure, the camera 83 corresponds to an example of a "camera" of the disclosure, the compartmentalized storage 911 of the component bin 91 corresponds to an example of a "container" of the disclosure, the depth image Id corresponds to an example of a "depth image" of the disclosure, the gray scale image Ig corresponds to an example of a "luminance image" of the disclosure, the composite image Ic corresponds to an example of a "composite image" of the disclosure, the corrected patch image Ipc corresponds to an example of a "target component image" of the disclosure, and the corrected cutting range Rcc corresponds to an example of a "hand range" of the disclosure.

Note that the disclosure is not limited to the above embodiment and various changes other than those described above can be made without departing from the gist of the disclosure. For example, in Step S105, the component P gripped by the robot hand 51 may be imaged by the camera 83 from mutually different directions to obtain a plurality of side view images. These side view images can be acquired by imaging the component P while rotating the robot hand 51 gripping the component P in the θ-direction. Hereby, the confirmation of the number of the components P in Step S107 and the confirmation of an abnormality (excessively small area) of the component P in Step S109 can be performed from a plurality of directions.

Figure 11:
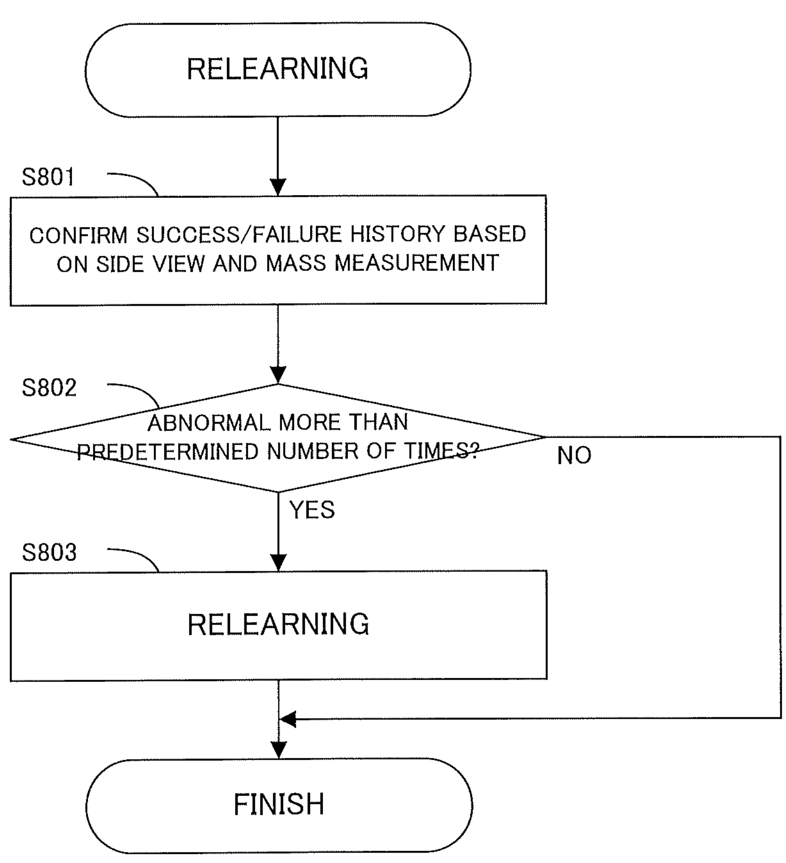
FIG. 11 is a flow chart showing an example of a method for relearning the grip classification neural network of the grip classification network unit.

Further, a flow chart of FIG. 11 may be performed for the learning of the grip classification neural network. Here, FIG. 11 is a flow chart showing an example of a method for relearning the grip classification neural network of the grip classification network unit. This flow chart is performed by the main controller 311, for example, at an end timing of planned bin picking or the like.

In Step S801, the main controller 311 confirms a history of detecting an abnormality based on a side view image ("NO" in Steps S107, S108) and an abnormality based on mass measurement ("NO" in Step S113) in bin picking performed in the past. If the number of abnormality detections is equal to or more than a predetermined number ("YES" in Step S802), the relearning of the grip classification neural network of the grip classification network unit 47 is performed (Step S803). In this relearning, the corrected patch images Ipc representing the components P detected to be abnormal and grip success/failure results (i.e. failures) are used as training data. Specifically, an error function is calculated based on a grip success probability and the grip success/failure result (failure) obtained by forward-propagating the corrected patch image Ipc in the grip classification neural network and this error function is back-propagated in the grip classification neural network, whereby the parameters of the grip classification neural network are updated (relearning).

That is, in an example of FIG. 11, the relearning of the grip classification neural network is performed based on a result of acquiring the grip state information (side view images, mass) for the component P gripped by the robot hand 51. In such a configuration, the relearning of the grip classification neural network is performed according to an actual success/failure result of the grip of the component P selected based on the grip success probability obtained for the corrected patch image Ipc, and the calculation accuracy of the grip success probability by the grip classification neural network can be improved.

Figure 12:
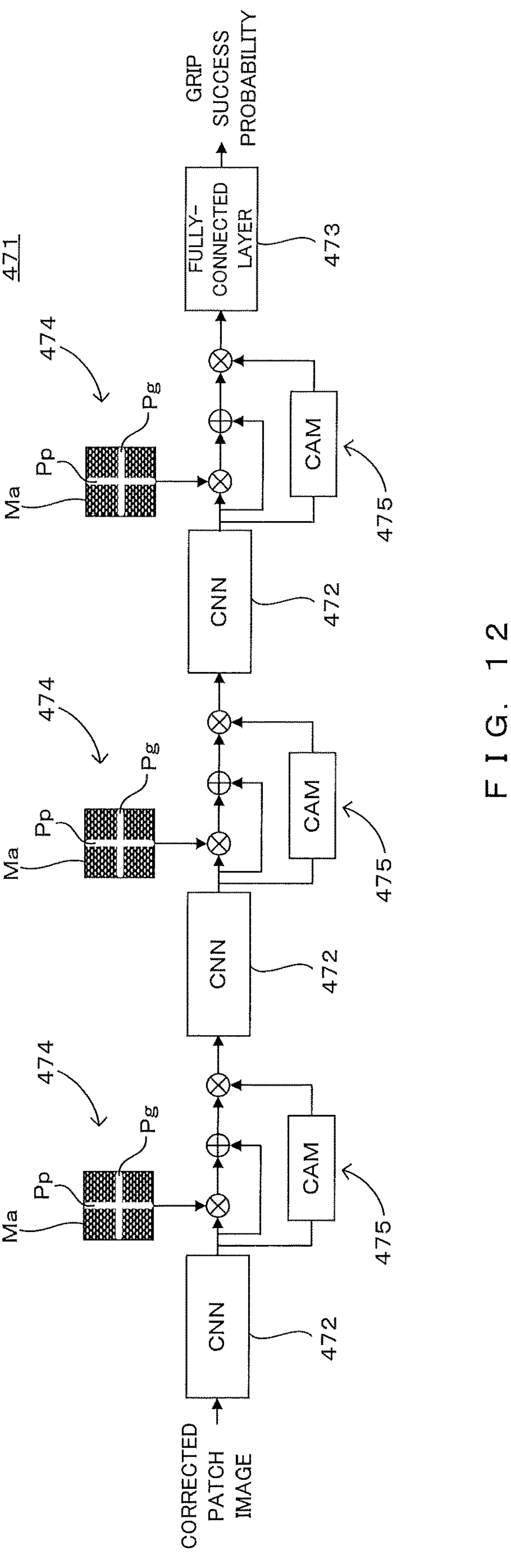
FIG. 12 is a modification of the grip classification neural network of the grip classification network unit.

FIG. 12 is a modification of the grip classification neural network of the grip classification network unit. In this grip classification neural network 471, multi-layer convolutional neural networks 472 and a fully-connected layer 473 are arrayed in series. Further, a space attention module 474 and a channel attention module 475 are provided on an output side of each convolutional neural network 472, and a feature map output from the convolutional neural network 472 is input to the next convolutional neural network 472 or the fully-connected layer 473 by way of weighting by the space attention module 474 and the channel attention module 475.

Particularly, an attention mask Ma added to the feature map by the space attention module 474 has two attention regions Pg, Pp passing through a center of the corrected patch image Ipc (in other words, the corrected cutting range Rcc). That is, in the attention mask Ma, weights of the attention regions Pg, Pp are larger than those of other regions, and these weights are added to the feature map. Here, the attention region Pg is parallel to the gripping direction G, and the attention region Pp is orthogonal to the gripping direction G. Particularly, if the long axis direction of the component P is orthogonal to the gripping direction G as in the above example, the attention region Pp is parallel to the long axis direction of the component P. That is, this attention mask Ma pays attention to the attention region Pp corresponding to an ideal position of the component P in the corrected patch image Ipc and the attention region Pg corresponding to approach paths of the claws 511 of the robot hand 51 with respect to this component P.

In the grip classification neural network, the attention mask Ma of such a configuration is added to the feature map output from the convolutional neural network 472 to weight the feature map. Therefore, an angle of the long axis direction of the component P with respect to the gripping direction G and a condition of a moving path of the robot hand 51 gripping the component P (presence or absence of another component) can be precisely reflected on judgement by the grip classification neural network.

Further, the method for generating the composite image Ic is not limited to the example using the above equation, but the composite image Ic may be generated by another equation for calculating the composite value Vc of the composite image Ic by weighting the luminance Vg of the gray scale image Ig by the depth Vd of the depth image Id.

Further, in the above example, the composite image Ic is generated by combining the gray scale image Ig and the depth image Id. At this time, the composite image Ic may be generated by combining an inverted gray scale image Ig (luminance image) obtained by inverting the luminance of the gray scale image Ig and the depth image Id. Particularly, in the case of gripping a component P having a black plated surface, it is preferred to generate the composite image Ic using the inverted gray scale image Ig.

Further, the patch image Ip needs not be cut from the binarized composite image Ic, but the patch image Ip may be cut from the composite image Ic without performing binarization. The same applies also to the corrected patch image Ipc.

Further, various setting modes of the cutting range Rc for the component P in the patch image processing can be assumed. For example, the cutting range Rc may be set such that the geometric centroid of the cutting range Rc coincides with that of the component P. However, without being limited to this example, the cutting range Rc may be, in short, set to include the targeted component P.

Further, a specific configuration of the robot hand 51 is not limited to the above example. For example, the number of the claws 511 of the robot hand 51 is not limited to two, but may be three or more. Further, it is also possible to use a robot hand 51, which sucks by a negative pressure or magnetic force. Even in these cases, the cutting range Rc can be set in a range to be gripped by the robot hand 51 and the patch image Ip can be cut from the cutting range Rc.

Further, in the above embodiment, the correction amount (Δx, Δy, Δθ) of the cutting range Rc, from which the patch image Ip was cut, is calculated by the alignment network unit 45 and the corrected patch image Ipc cut from the corrected cutting range Rcc obtained by correcting the cutting range Rc by this correction amount (Δx, Δy, Δθ) is input to the grip classification network unit 47. However, without correction by the correction amount (Δx, Δy, Δθ), the patch image Ip may be directly input to the grip classification network unit 47 and the grip classification network unit 47 may directly calculate the grip success probability from the patch image Ip.

What is claimed is:

1. An image processing device, comprising:

an image acquirer configured to acquire a luminance image representing a plurality of components stored in a container and a depth image representing the plurality of components; and an image compositor configured to generate a composite image by combining the luminance image and the depth image acquired by the image acquirer, wherein:

the luminance image represents a luminance Vg for each pixel, the depth image represents a depth Vd for each pixel, the composite image represents a composite value Vc for each pixel, and the image compositor is configured to generate the composite image by calculating a composite value Vc obtained by weighting the luminance Vg by the depth Vd.

2. The image processing device according to claim 1, wherein the image compositor is configured to generate the composite image based on the following equation:

$$Vc = Vd \times \left(1 + Vg/\max(Vg)\right)$$

where max (Vg) is a maximum value of the luminances Vg included in the luminance image.

3. The image processing device according to claim 1, further comprising:

a success probability calculator configured to generate a plurality of target component images representing different components that are different from each other by setting a hand range representing a range of a robot hand for the component and generating the target component image representing the component included in the hand range based on the composite image, and calculate a grip success probability when the robot hand tries to grip the component in a positional relationship of the robot hand and the component represented by the target component image for each of the plurality of target component images.

4. The image processing device according to claim 3, wherein:

the success probability calculator is configured to select one target component image, out of the plurality of target component images, based on the grip success probabilities respectively calculated for the plurality of target component images, and determine to grip the component represented by the one target component image by the robot hand in a posture represented by the one target component image.

5. The image processing device according to claim 4, wherein:

the success probability calculator is configured to select the target component image having a highest grip success probability, out of the target component images not satisfying a predetermined exclusion condition out of the plurality of target component images, as the one target component image.

6. The image processing device according to claim 5, wherein:

the predetermined exclusion condition is such a condition that a distance between an end of the container and the target component image is less than a predetermined value.

7. The image processing device according to claim 4, wherein:

the success probability calculator includes a neural network having learned a relationship of the target component image and the grip success probability using a success/failure of grip when the robot hand tries to grip the component in a positional relationship of the robot hand and the component represented by the target component image as training data, and the grip success probability is calculated for each of the plurality of target component images by the neural network.

8. The image processing device according to claim 7, further comprising:

a success/failure determiner configured to acquire grip state information representing a state in which the component represented by the one target component image is gripped by the robot hand in the posture represented by the one target component image and determining a success/failure of the grip of the component by the robot hand.

9. The image processing device according to claim 8, wherein:

the success/failure determiner is configured to acquire a mass measured by a mass meter when the robot hand places the component gripped from the container on the mass meter as the grip state information.

10. The image processing device according to claim 8, wherein:

the success/failure determiner is configured to acquire an image obtained by capturing the component gripped by the robot hand by a camera as the grip state information.

11. The image processing device according to claim 10, wherein:

the success/failure determiner is configured to acquire a plurality of images obtained by capturing the component gripped by the robot hand from mutually different directions by the camera as the grip state information.

12. The image processing device according to claim 8, wherein:

the success probability calculator is configured to cause the neural network to relearn based on a result of acquiring the grip state information for the component gripped by the robot hand.

13. A component gripping system, comprising:

the image processing device according to claim 4; and a robot hand gripping the component based on a determination of the image processing device to select one target component image out of the plurality of target component images and grip the component represented by the one target component image by the robot hand in a posture represented by the one target component image.

14. An image processing method, comprising:

acquiring a luminance image representing a plurality of components stored in a container and a depth image representing the plurality of components; and generating a composite image by combining the luminance image and the depth image, wherein:

the luminance image represents a luminance Vg for each pixel, the depth image represents a depth Vd for each pixel, the composite image represents a composite value Vc for each pixel, and generating the composite image includes generating the composite image by calculating a composite value Vc obtained by weighting the luminance Vg by the depth Vd.

15. A component gripping method, comprising:

acquiring a luminance image representing a plurality of components stored in a container and a depth image representing the plurality of components;

generating a composite image by combining the luminance image and the depth image;

generating a plurality of target component images respectively representing different components each other by setting a hand range representing a range of a robot hand for the component and generating the target component image representing the component included in the hand range based on the composite image and calculating a grip success probability when the robot hand tries to grip the component in a positional relationship of the robot hand and the component represented by the target component image for each of the plurality of target component images;

selecting one target component image, out of the plurality of target component images, based on the grip success probabilities respectively calculated for the plurality of target component images and determining to grip the component represented by the one target component image by the robot hand in a posture represented by the one target component image; and gripping the component by the robot hand based on a determination to select one target component image out of the plurality of target component images and grip the component represented by the one target component image by the robot hand in a posture represented by the one target component image.

16. The image processing device according claim 1, further comprising:

a success probability calculator configured to generate a plurality of target component images representing different components that are different from each other by setting a hand range representing a range of a robot hand for the component and generating the target component image representing the component included in the hand range based on the composite image, and calculate a grip success probability when the robot hand tries to grip the component in a positional relationship of the robot hand and the component represented by the target component image for each of the plurality of target component images.

17. An image processing device, comprising:

an image acquirer configured to acquire a luminance image representing a plurality of components stored in a container and a depth image representing the plurality of components;

an image compositor configured to generate a composite image by combining the luminance image and the depth image acquired by the image acquirer; and a success probability calculator configured to generate a plurality of target component images representing different components that are different from each other by setting a hand range representing a range of a robot hand for the component and generating the target component image representing the component included in the hand range based on the composite image, and calculate a grip success probability when the robot hand tries to grip the component in a positional relationship of the robot hand and the component represented by the target component image for each of the plurality of target component images, wherein:

the success probability calculator is configured to select one target component image, out of the plurality of target component images, based on the grip success probabilities respectively calculated for the plurality of target component images, and determine to grip the component represented by the one target component image by the robot hand in a posture represented by the one target component image, the success probability calculator is configured to select the target component image having a highest grip success probability, out of the target component images not satisfying a predetermined exclusion condition out of the plurality of target component images, as the one target component image, and the success probability calculator includes a neural network having learned a relationship of the target component image and the grip success probability using a success/failure of grip when the robot hand tries to grip the component in a positional relationship of the robot hand and the component represented by the target component image as training data, and the grip success probability is calculated for each of the plurality of target component images by the neural network.

18. The image processing device according to claim 9, wherein:

the success/failure determiner is configured to acquire an image obtained by capturing the component gripped by the robot hand by a camera as the grip state information.

19. The image processing device according to claim 9, wherein:

the success probability calculator is configured to cause the neural network to relearn based on a result of acquiring the grip state information for the component gripped by the robot hand.

* * * * *